US012795481B2

(12) United States Patent
Cheng et al.

(10) Patent No.: US 12,795,481 B2
(45) Date of Patent: Nov. 10, 2026

(54) RANDOM ACCESS CHANNEL TYPE SELECTION AND FALLBACK MECHANISM RELATED TO SLICING

(71) Applicant: QUALCOMM Incorporated, San Diego, CA (US)

(72) Inventors: Peng Cheng, Beijing (CN); Jianhua Liu, Beijing (CN); Linhai He, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 18/264,550

(22) PCT Filed: Mar. 31, 2021

(86) PCT No.: PCT/CN2021/084429

§ 371 (c)(1),
(2) Date: Aug. 7, 2023

(87) PCT Pub. No.: WO2022/205077

PCT Pub. Date: Oct. 6, 2022

(65) Prior Publication Data

US 2024/0049291 A1 Feb. 8, 2024

(51) Int. Cl.
*H04W 36/06* (2009.01)
*H04W 48/18* (2009.01)
(Continued)

(52) U.S. Cl.
CPC ........... *H04W 36/06* (2013.01); *H04W 48/18* (2013.01); *H04W 74/006* (2013.01); *H04W 74/0836* (2024.01); *H04W 74/0838* (2024.01)

(58) Field of Classification Search
CPC ... H04W 36/06; H04W 48/18; H04W 74/006; H04W 74/0836; H04W 74/0838; H04W 24/08; H04W 74/04; H04B 17/328
See application file for complete search history.

(56) References Cited

U.S. PATENT DOCUMENTS

2015/0049697 A1* 2/2015 Worrall ................. H04W 72/21 370/329
2017/0079059 A1* 3/2017 Li ......................... H04W 16/02
(Continued)

FOREIGN PATENT DOCUMENTS

CN 107734708 A 2/2018
CN 111448841 A 7/2020
(Continued)

OTHER PUBLICATIONS

International Search Report and Written Opinion—PCT/CN2021/084429—ISA/EPO—Jan. 6, 2022.
(Continued)

*Primary Examiner* — Edan Orgad
*Assistant Examiner* — Samuel Roberge Bettendorf
(74) *Attorney, Agent, or Firm* — QUALCOMM Incorporated

(57) ABSTRACT

Methods, systems, and devices for wireless communications are described. A user equipment (UE) may receive an indication of a configuration for a set of random access channel (RACH) procedure types for a bandwidth part of the UE, each RACH procedure type in the set of RACH procedure types being different from at least some if not all the other RACH procedure types in the set of RACH procedure types. The UE may select a RACH procedure type from the set of RACH procedure types for the RACH procedure based at least in part on the indication of the configuration for the set of RACH procedure types and on a trigger to perform a RACH procedure for a network slice.
(Continued)

The UE may perform the RACH procedure for the network slice according to the RACH procedure type.

29 Claims, 16 Drawing Sheets

(51) Int. Cl.

| | |
|---|---|
| ***H04W 74/00*** | (2009.01) |
| ***H04W 74/0836*** | (2024.01) |
| ***H04W 74/0838*** | (2024.01) |

(56) References Cited

U.S. PATENT DOCUMENTS

| | | | | |
|---|---|---|---|---|
| 2019/0110300 | A1 | 4/2019 | Chen et al. | |
| 2020/0100299 | A1* | 3/2020 | Loehr | H04L 5/0094 |
| 2020/0314913 | A1* | 10/2020 | Rastegardoost | H04L 5/0048 |
| 2021/0100034 | A1* | 4/2021 | Turtinen | H04W 72/046 |
| 2021/0227587 | A1* | 7/2021 | Tsai | H04W 36/0077 |
| 2023/0049532 | A1* | 2/2023 | Qu | H04W 48/16 |
| 2023/0094982 | A1 | 3/2023 | Jiang | |

FOREIGN PATENT DOCUMENTS

| | | | | |
|---|---|---|---|---|
| KR | 20200051052 | A | 5/2020 | |
| WO | WO-2022193258 | A1 * | 9/2022 | H04W 74/08 |

OTHER PUBLICATIONS

Qualcomm Incorporated: "Discussion on Candidate Solutions of Slice-Based RACH", 3GPP Draft, 3GPP TSG RAN WG2 Meeting #113-e, R2-2100129, E-Conference, Jan. 25-Feb. 5, 2021, pp. 1-4.
NEC: "RACH Enhancements to Enable UE Fast Access to the Intended", 3GPP TSG-RAN WG2 Meeting #112 electronic, R2-2009974, 3rd Generation Partnership Project, Mobile Competence Centre, 650, Route Des Lucioles, F-06921 Sophia-Antipolis Cedex, France, vol. RAN WG2, No. electronic, Nov. 2, 2020-Nov. 13, 2020, Oct. 23, 2020, XP051942727, 2 pages, paragraph [02.3].
Spreadtrum Communications: "Consideration on Slice Based RACH Configuration", 3GPP TSG-RAN WG2 Meeting #113 electronic, R2-2100662, 3rd Generation Partnership Project, Mobile Competence Centre, 650, Route Des Lucioles, F-06921 Sophia-Antipolis Cedex, France, vol. RAN WG2, No. electronic, Jan. 25, 2021-Feb. 5, 2021, Jan. 15, 2021, XP051973783, 3 pages, paragraphs [02.1]-[02.2].
Supplementary European Search Report—EP21933752—Search Authority—The Hague—Nov. 6, 2024.

* cited by examiner

RANDOM ACCESS CHANNEL TYPE SELECTION AND FALLBACK MECHANISM RELATED TO SLICING

CROSS REFERENCE

The present Application is a 371 national stage filing of International PCT Application No. PCT/CN2021/084429 by CHENG et al. entitled "RANDOM ACCESS CHANNEL TYPE SELECTION AND FALLBACK MECHANISM RELATED TO SLICING," filed Mar. 31, 2021, which is assigned to the assignee hereof, and which is expressly incorporated by reference in its entirety herein.

FIELD OF TECHNOLOGY

The following relates to wireless communications, including random access channel type selection and fallback mechanisms related to slicing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support random access channel (RACH) type selection and fallback mechanisms related to slicing. Generally, the described techniques provide for network slice-based RACH procedures. For example, a base station may configure a user equipment (UE) with a set of RACH procedure types, such as contention-based random access (CBRA), contention free random access (CFRA), slice-based, or common, etc., RACH procedure types. A network slice may be triggered indicating that a RACH procedure is to be performed for the network slice. The UE may select a particular RACH procedure type from the set of configured RACH procedure types based on, for example, the network slice and the configured RACH procedure types. Accordingly, the UE may perform the RACH procedure using the selected RACH procedure type. Aspects of the described techniques, devices, and methods provide specific configurations and selection of RACH procedure types that may be applied for slice-aware RACH procedures.

A method for wireless communication at a UE is described. The method may include receiving an indication of a configuration for a set of RACH procedure types for a bandwidth part (BWP) of the UE, each RACH procedure type in the set of RACH procedure types being different from other RACH procedure types in the set of RACH procedure types, selecting a RACH procedure type from the set of RACH procedure types for the RACH procedure based on the indication of the configuration for the set of RACH procedure types and on a trigger to perform a RACH procedure for a network slice, and performing the RACH procedure for the network slice according to the RACH procedure type.

An apparatus for wireless communication at a UE is described. The apparatus may include a processor, memory coupled with the processor, and instructions stored in the memory. The instructions may be executable by the processor to cause the apparatus to receive an indication of a configuration for a set of RACH procedure types for a BWP of the UE, each RACH procedure type in the set of RACH procedure types being different from other RACH procedure types in the set of RACH procedure types, select a RACH procedure type from the set of RACH procedure types for the RACH procedure based on the indication of the configuration for the set of RACH procedure types and on a trigger to perform a RACH procedure for a network slice, and perform the RACH procedure for the network slice according to the RACH procedure type.

Another apparatus for wireless communication at a UE is described. The apparatus may include means for receiving an indication of a configuration for a set of RACH procedure types for a BWP of the UE, each RACH procedure type in the set of RACH procedure types being different from other RACH procedure types in the set of RACH procedure types, means for selecting a RACH procedure type from the set of RACH procedure types for the RACH procedure based on the indication of the configuration for the set of RACH procedure types and on a trigger to perform a RACH procedure for a network slice, and means for performing the RACH procedure for the network slice according to the RACH procedure type.

A non-transitory computer-readable medium storing code for wireless communication at a UE is described. The code may include instructions executable by a processor to receive an indication of a configuration for a set of RACH procedure types for a BWP of the UE, each RACH procedure type in the set of RACH procedure types being different from other RACH procedure types in the set of RACH procedure types, select a RACH procedure type from the set of RACH procedure types for the RACH procedure based on the indication of the configuration for the set of RACH procedure types and on a trigger to perform a RACH procedure for a network slice, and perform the RACH procedure for the network slice according to the RACH procedure type.

Some examples of the method, apparatuses, and non-transitory computer-readable medium described herein may further include operations, features, means, or instructions for determining that the set of RACH procedure types includes a two-step contention free RACH procedure type (e.g., CFRA RACH procedure type), a two-step slice-based RACH procedure type, and a two-step common RACH procedure type, where selecting the RACH procedure type includes and selecting the two-step contention free RACH procedure type for the RACH procedure based on a receive power level of a synchronization signal satisfying a threshold receive power level and the network slice.

Some examples of the method, apparatuses, and non-transitory computer-readable medium described herein may further include operations, features, means, or instructions for determining that the receive power level of the synchronization signal fails to satisfy the threshold receive power level, where selecting the RACH procedure type includes and selecting the two-step slice-based RACH procedure type based on the receive power level failing to satisfy the threshold receive power level.

Some examples of the method, apparatuses, and non-transitory computer-readable medium described herein may further include operations, features, means, or instructions for determining that the RACH procedure was unsuccessful after a threshold number of attempts, the threshold number of attempts based on the trigger and performing a fallback RACH procedure using a four-step RACH procedure type of the set of RACH procedure types based on the unsuccessful RACH procedure.

Some examples of the method, apparatuses, and non-transitory computer-readable medium described herein may further include operations, features, means, or instructions for determining that the set of RACH procedure types includes a four-step contention free RACH procedure type, a four-step slice-based RACH procedure type, and a four-step common RACH procedure type, where selecting the RACH procedure type includes and selecting the four-step contention free RACH procedure type for the RACH procedure based on a receive power level of a synchronization signal satisfying a threshold receive power level and the network slice.

Some examples of the method, apparatuses, and non-transitory computer-readable medium described herein may further include operations, features, means, or instructions for determining that the receive power level of the synchronization signal fails to satisfy the threshold receive power level, where selecting the RACH procedure type includes and selecting the four-step slice-based RACH procedure type based on the receive power level failing to satisfy the threshold receive power level.

Some examples of the method, apparatuses, and non-transitory computer-readable medium described herein may further include operations, features, means, or instructions for determining that the set of RACH procedure types includes a two-step slice-based RACH procedure type and a four-step common RACH procedure type, where selecting the RACH procedure type includes and selecting the two-step slice-based RACH procedure type for the RACH procedure based on the network slice.

Some examples of the method, apparatuses, and non-transitory computer-readable medium described herein may further include operations, features, means, or instructions for determining that the RACH procedure was unsuccessful after a threshold number of attempts, the threshold number of attempts based on the trigger and performing a fallback RACH procedure using the four-step common RACH procedure type based on the unsuccessful RACH procedure.

Some examples of the method, apparatuses, and non-transitory computer-readable medium described herein may further include operations, features, means, or instructions for determining that the set of RACH procedure types includes a two-step slice-based RACH procedure type, a four-step slice-based RACH procedure type, and a four-step common RACH procedure type, where selecting the RACH procedure type includes and selecting the two-step slice-based RACH procedure type for the RACH procedure based on a receive power level of a synchronization signal satisfying a threshold receive power level and the network slice.

Some examples of the method, apparatuses, and non-transitory computer-readable medium described herein may further include operations, features, means, or instructions for determining that the receive power level of the synchronization signal fails to satisfy the threshold receive power level, where selecting the RACH procedure type includes and selecting the four-step slice-based RACH procedure type for the RACH procedure based on the receive power level failing to satisfy the threshold receive power level.

Some examples of the method, apparatuses, and non-transitory computer-readable medium described herein may further include operations, features, means, or instructions for determining that the RACH procedure was unsuccessful after a threshold number of attempts, the threshold number of attempts based on the trigger and performing a fallback RACH procedure using the four-step slice-based RACH procedure type based on the unsuccessful RACH procedure.

Some examples of the method, apparatuses, and non-transitory computer-readable medium described herein may further include operations, features, means, or instructions for determining that the set of RACH procedure types includes a four-step slice-based RACH procedure type and a two-step or four-step common RACH procedure type, where selecting the RACH procedure type includes, selecting the four-step slice-based RACH procedure type for the RACH procedure based on the network slice, and refraining from performing a fallback RACH procedure using the two-step or four-step common RACH procedure type.

Some examples of the method, apparatuses, and non-transitory computer-readable medium described herein may further include operations, features, means, or instructions for determining that the set of RACH procedure types includes a two-step slice-based RACH procedure type, a two-step common RACH procedure type, a four-step slice-based RACH procedure type, and a four-step common RACH procedure type, where selecting the RACH procedure type includes and selecting the two-step slice-based RACH procedure type for the RACH procedure based on a receive power level of a synchronization signal satisfying a threshold receive power level and the network slice.

Some examples of the method, apparatuses, and non-transitory computer-readable medium described herein may further include operations, features, means, or instructions for determining that the receive power level of the synchronization signal fails to satisfy the threshold receive power level, where selecting the RACH procedure type includes and selecting the four-step slice-based RACH procedure type for the RACH procedure based on the receive power level failing to satisfy the threshold receive power level.

Some examples of the method, apparatuses, and non-transitory computer-readable medium described herein may further include operations, features, means, or instructions for determining that the RACH procedure was unsuccessful after a threshold number of attempts, the threshold number of attempts based on the trigger and performing a fallback RACH procedure using the four-step slice-based RACH procedure type based on the unsuccessful RACH procedure.

Some examples of the method, apparatuses, and non-transitory computer-readable medium described herein may further include operations, features, means, or instructions for determining that a second RACH procedure may be being performed separate from the RACH procedure to be performed for the network slice, the second RACH procedure associated with a priority level and canceling the second RACH procedure to perform the RACH procedure type for the network slice based on the network slice being associated with a higher priority level than the priority level of the second RACH procedure.

In some examples of the method, apparatuses, and non-transitory computer-readable medium described herein, a resource of each RACH procedure type may be non-overlapping with resources of other RACH procedure types in the set of RACH procedure types.

In some examples of the method, apparatuses, and non-transitory computer-readable medium described herein, the network slice includes a network slice assistance information, a single network slice selection assistance information, a slice type, a service type, a set of single network slice selection assistance information, or any combination thereof.

In some examples of the method, apparatuses, and non-transitory computer-readable medium described herein, an uplink data associated with the network slice may be identified by the UE while the UE may be operating in a radio resource control (RRC) idle state or a RRC inactive state.

In some examples of the method, apparatuses, and non-transitory computer-readable medium described herein, an uplink data associated with the network slice may be identified by the UE while the UE may be operating in a RRC connected state and the UE may be not configured with a physical uplink control channel resource to transmit a scheduling request.

In some examples of the method, apparatuses, and non-transitory computer-readable medium described herein, an uplink data associated with the network slice may be identified by the UE while the UE may be operating in a RRC connected state and the UE may be not uplink synchronized.

A method for wireless communication at a base station is described. The method may include transmitting, to a UE, an indication of a configuration for a set of RACH procedure types for a BWP of the UE, each RACH procedure type in the set of RACH procedure types being different from other RACH procedure types in the set of RACH procedure types, transmitting, to the UE, a trigger to perform a RACH procedure type for a network slice, and performing the RACH procedure for the network slice according to a RACH procedure type selected by the UE from the set of RACH procedure types based on the indication of the configuration for the set of RACH procedure types and on the trigger.

An apparatus for wireless communication at a base station is described. The apparatus may include a processor, memory coupled with the processor, and instructions stored in the memory. The instructions may be executable by the processor to cause the apparatus to transmit, to a UE, an indication of a configuration for a set of RACH procedure types for a BWP of the UE, each RACH procedure type in the set of RACH procedure types being different from other RACH procedure types in the set of RACH procedure types, transmit, to the UE, a trigger to perform a RACH procedure type for a network slice, and perform the RACH procedure for the network slice according to a RACH procedure type selected by the UE from the set of RACH procedure types based on the indication of the configuration for the set of RACH procedure types and on the trigger.

Another apparatus for wireless communication at a base station is described. The apparatus may include means for transmitting, to a UE, an indication of a configuration for a set of RACH procedure types for a BWP of the UE, each RACH procedure type in the set of RACH procedure types being different from other RACH procedure types in the set of RACH procedure types, means for transmitting, to the UE, a trigger to perform a RACH procedure type for a network slice, and means for performing the RACH procedure for the network slice according to a RACH procedure type selected by the UE from the set of RACH procedure types based on the indication of the configuration for the set of RACH procedure types and on the trigger.

A non-transitory computer-readable medium storing code for wireless communication at a base station is described. The code may include instructions executable by a processor to transmit, to a UE, an indication of a configuration for a set of RACH procedure types for a BWP of the UE, each RACH procedure type in the set of RACH procedure types being different from other RACH procedure types in the set of RACH procedure types, transmit, to the UE, a trigger to perform a RACH procedure type for a network slice, and perform the RACH procedure for the network slice according to a RACH procedure type selected by the UE from the set of RACH procedure types based on the indication of the configuration for the set of RACH procedure types and on the trigger.

In some examples of the method, apparatuses, and non-transitory computer-readable medium described herein, performing the RACH procedure may include operations, features, means, or instructions for performing the RACH procedure using the two-step contention free RACH procedure type based on the UE determining that a receive power level of a synchronization signal satisfies a threshold receive power level and the network slice.

In some examples of the method, apparatuses, and non-transitory computer-readable medium described herein, performing the RACH procedure may include operations, features, means, or instructions for performing the RACH procedure using the two-step slice-based RACH procedure type based on the UE determining that the receive power level fails to satisfy the threshold receive power level.

Some examples of the method, apparatuses, and non-transitory computer-readable medium described herein may further include operations, features, means, or instructions for performing a fallback RACH procedure using a four-step RACH procedure type of the set of RACH procedure types based on the UE determining that the RACH procedure was unsuccessful after a threshold number of attempts.

In some examples of the method, apparatuses, and non-transitory computer-readable medium described herein, performing the RACH procedure may include operations, features, means, or instructions for performing the RACH procedure using the four-step contention free RACH procedure type based on the UE determining that a receive power level of a synchronization signal satisfies a threshold receive power level and the network slice.

In some examples of the method, apparatuses, and non-transitory computer-readable medium described herein, performing the RACH procedure may include operations, features, means, or instructions for performing the RACH procedure using the four-step slice-based RACH procedure type based on the UE determining that the receive power level fails to satisfy the threshold receive power level.

In some examples of the method, apparatuses, and non-transitory computer-readable medium described herein, performing the RACH procedure may include operations, features, means, or instructions for performing the RACH procedure using the two-step slice-based RACH procedure type based on the network slice.

Some examples of the method, apparatuses, and non-transitory computer-readable medium described herein may further include operations, features, means, or instructions for performing a fallback RACH procedure using the four-step common RACH procedure type based on the UE determining that the RACH procedure was unsuccessful after a threshold number of attempts.

In some examples of the method, apparatuses, and non-transitory computer-readable medium described herein, performing the RACH procedure may include operations, features, means, or instructions for performing the RACH procedure using the two-step slice-based RACH procedure type based on the UE determining that a receive power level of a synchronization signal satisfies a threshold receive power level and the network slice.

In some examples of the method, apparatuses, and non-transitory computer-readable medium described herein, performing the RACH procedure may include operations, features, means, or instructions for performing the RACH procedure using the four-step slice-based RACH procedure type based on the UE determining that the receive power level fails to satisfy the threshold receive power level.

Some examples of the method, apparatuses, and non-transitory computer-readable medium described herein may further include operations, features, means, or instructions for performing a fallback RACH procedure using the four-step slice-based RACH procedure type based on the UE determining that the RACH procedure was unsuccessful after a threshold number of attempts.

In some examples of the method, apparatuses, and non-transitory computer-readable medium described herein, performing the RACH procedure may include operations, features, means, or instructions for performing the RACH procedure using the four-step slice-based RACH procedure type based on the network slice and refraining from performing a fallback RACH procedure using the two-step or four-step common RACH procedure type.

In some examples of the method, apparatuses, and non-transitory computer-readable medium described herein, performing the RACH procedure may include operations, features, means, or instructions for performing the RACH procedure using the two-step slice-based RACH procedure type based on the UE determining that a receive power level of a synchronization signal satisfies a threshold receive power level and the network slice.

Some examples of the method, apparatuses, and non-transitory computer-readable medium described herein may further include operations, features, means, or instructions for determining that the receive power level of the synchronization signal fails to satisfy the threshold receive power level, where performing the RACH procedure includes and performing the RACH procedure using the four-step slice-based RACH procedure type based on the UE determining that the receive power level fails to satisfy the threshold receive power level.

Some examples of the method, apparatuses, and non-transitory computer-readable medium described herein may further include operations, features, means, or instructions for performing a fallback RACH procedure using the four-step slice-based RACH procedure type based on the UE determining that the RACH procedure was unsuccessful after a threshold number of attempts.

Some examples of the method, apparatuses, and non-transitory computer-readable medium described herein may further include operations, features, means, or instructions for determining that a second RACH procedure may be being performed with the UE separate from the RACH procedure to be performed for the network slice, the second RACH procedure associated with a priority level and canceling the second RACH procedure to perform the RACH procedure for the network slice based on the network slice being associated with a higher priority level than the priority level of the second RACH procedure.

In some examples of the method, apparatuses, and non-transitory computer-readable medium described herein, a resource of each RACH procedure type may be non-overlapping with resources of other RACH procedure types in the set of RACH procedure types.

In some examples of the method, apparatuses, and non-transitory computer-readable medium described herein, the network slice includes a network slice assistance information, a single network slice selection assistance information, a slice type, a service type, a set of single network slice selection assistance information, or any combination thereof.

DETAILED DESCRIPTION

Figure 1:
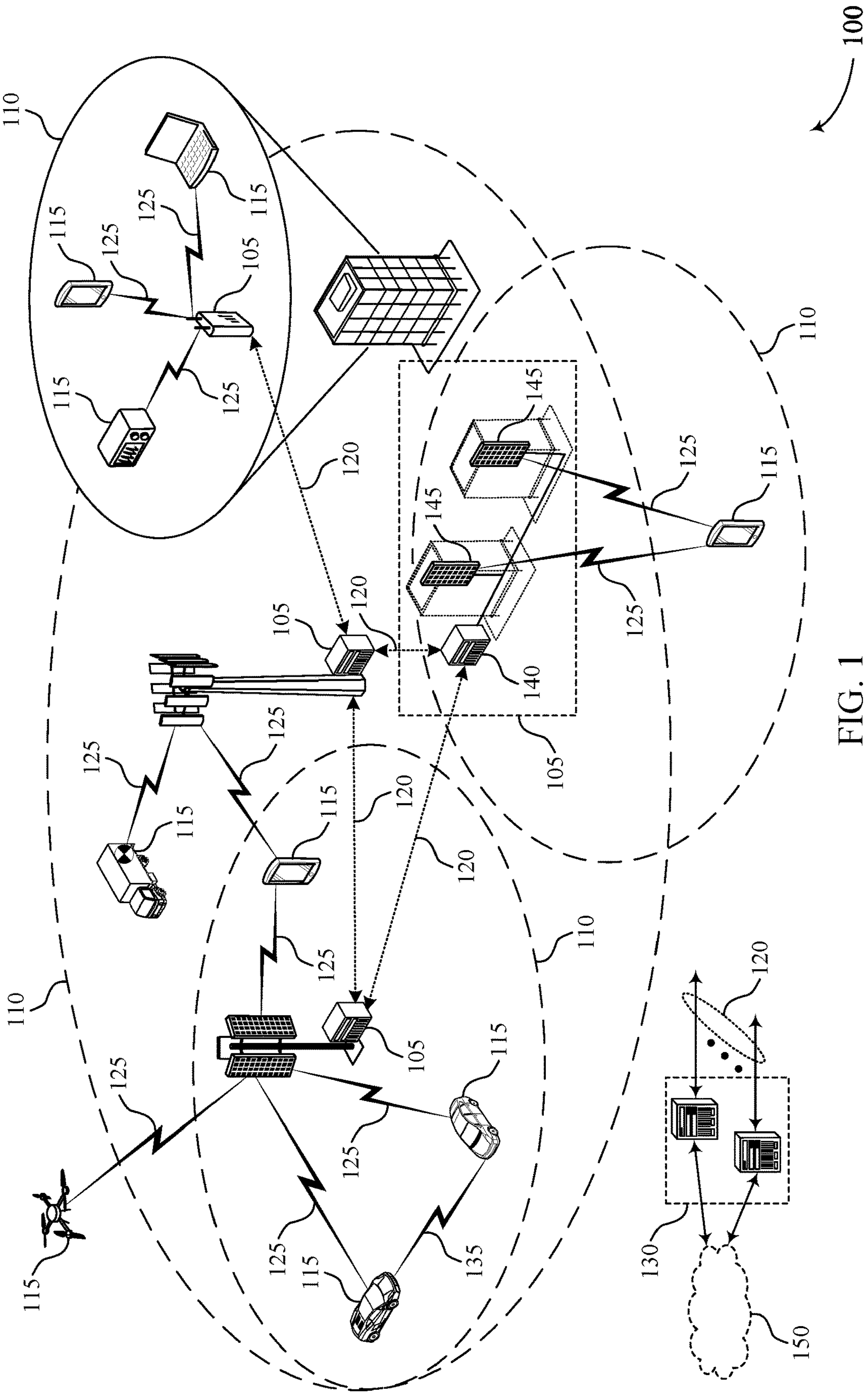
FIG. 1 illustrates an example of a wireless communications system that supports random access channel (RACH) type selection and fallback mechanisms related to slicing in accordance with aspects of the present disclosure.

A user equipment (UE) in a wireless communications system may perform a random access channel (RACH) procedure to establish a connection, such as a Radio Resource Control (RRC) connection, with a base station. A UE may perform the RACH procedure under different circumstances, such as performing the RACH procedure for initial access or performing the RACH procedure for a handover or beam failure recovery. The UE may be configured with one or more sets of RACH prioritization parameters, which may be related to a priority of a RACH procedure performed by the UE. For example, some sets of RACH prioritization parameters may configure the UE to more aggressively perform a RACH procedure to quickly establish an RRC connection for higher priority signaling. A set of RACH prioritization parameters may include, for example, a preamble ramping step or a backoff scaling factor, with values set to increase the priority of a RACH procedure performed by the UE.

Some wireless communications systems may implement network slicing to provide multiple virtual networks using common network infrastructure. Network slices may be associated with different services, priorities, access categories, access identities, security requirements, or other characteristics (or any combination thereof), to provide separate virtual networks with different uses for the network slices. Some wireless communications systems that implement network slicing may use cell-specific RACH resources and configurations for RACH procedures. These techniques of other different wireless communications systems may not provide techniques for network slice-aware RACH procedures. Therefore, a UE in these other different systems may use a same RACH configuration for each network slice. As such, higher priority network slices may perform RACH procedures using a same configuration as other, lower priority network slices, which may delay RACH procedures for urgent or higher priority network slices in some instances.

Aspects of the present disclosure and the described techniques provide for network slice-based RACH procedures. For example, a base station may configure a UE with a set of RACH procedure types, such as contention-based random access (CBRA) or contention free random access (CFRA), slice-based or common, etc., RACH procedure types. A network slice may be triggered indicating that a RACH procedure is to be performed for the network slice. The UE may select a particular RACH procedure type from the set of configured RACH procedure types based on, for example, the network slice and the configured RACH procedure types. Accordingly, the UE may perform the RACH procedure using the selected RACH procedure type. Aspects of the described techniques provide specific configurations and selection of RACH procedure types that may be applied for the slice-aware RACH procedures.

Aspects of the disclosure are further illustrated by and described with reference to apparatus diagrams, system diagrams, and flowcharts that relate to RACH type selection and fallback mechanisms related to slicing.

FIG. 1 illustrates an example of a wireless communications system 100 that supports RACH type selection and fallback mechanisms related to slicing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term “cell” may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 in a wireless communications system may perform a RACH procedure to establish, or re-establish, an RRC connection with a cell or a base station 105. In some cases, the UE 115 may perform a four-step RACH procedure or a two-step RACH procedure, or the UE 115 may be configured to perform both two-step and four-step RACH procedures. For a four-step RACH procedure, a UE 115 may transmit a random access preamble (e.g., a first RACH message or RACH Message 1) to a beam provided by a base station 105. The base station 105 may transmit a random access response (e.g., a second RACH message or RACH Message 2) to the UE 115 in response to the RACH preamble. The random access response may be transmitted to the UE 115 on downlink shared channel resources and may include an uplink grant scheduling the UE 115 for a third random access message (e.g., RACH Message 3). The third random access message transmitted by the UE 115 may be based on a scenario in which the UE 115 is performing the RACH procedure. For example, the third random access message may include initial RRC connection information for initial access, RRC connection reestablishment information, or handover information, among other information for different scenarios. The base station 105 may receive the third random access message and transmit a fourth random access message in response. The fourth random access message (e.g., RACH Message 4) may be a contention resolution message, which may complete the RACH procedure. The two-step RACH procedure may be similar to the four-step RACH procedure and may include the UE 115 transmitting a RACH message A (MsgA) to the base station 105 and the base station 105 responding with a RACH message B (MsgB).

A UE 115 may perform a RACH procedure under different circumstances. For example, the UE 115 may perform a RACH procedure for initial access to establish an RRC connection, a handover to another base station 105, or for beam failure recovery, among other examples.

In some cases, a UE 115 may be configured with one or more sets of RACH prioritization parameters, which may be related to a priority the UE has when performing a RACH procedure. For example, some sets of RACH prioritization parameters may enable the UE 115 to more aggressively perform a RACH procedure to recover a failed beam or be handed over to a higher quality cell. For example, a preamble ramping step and a backoff scaling factor may be used, or set, for prioritized RACH access when the UE 115 performs a RACH procedure for a handover or beam failure recovery. These techniques may be implemented for different types of RACH procedures (e.g., two-step RACH and four-step RACH) or RACH procedures triggered by different events or signaling. For example, the UE 115 may use a set of RACH prioritization parameters that increase the priority of a RACH procedure which is triggered by mission critical service (MCS) communications or multimedia priority service (MPS) communications.

In some cases, a UE 115 may be configured to communicate according to one or more access categories. For example, different access categories may correspond to different conditions related to the UE 115 and a different type of access attempt. For example, Access Category 1 may correspond to when a UE 115 is configured for delay tolerant services and subject to access control for Access Category 1, which may be based on a relation of the UE's public land mobile network (PLMN) or home PLMN (HPMLN). For Access Category 1, the UE 115 may perform any type of access attempt except for emergency access attempts. Other access categories may similarly be associated with an access category number, an associated condition related to the UE 115, and a type of access attempt that may be used for the access category.

The wireless communications system 100 may implement network slicing to provide multiple virtual networks using common network infrastructure. Network slices may be associated with different services, priorities, access categories, access identities, security requirements, or other characteristics, to provide separate virtual networks with different uses for the network slices.

Network slices may be negotiated by a NAS registration procedure. A base station 105 may send a setup request (e.g., a Next Generation (NG) setup request) to an AMF of the core network 130. The setup request may include network slice selection assistance information (NSSAI) (e.g., a single NSSAI (S-NSSAI)) list per tracking area identifier (TAI). The AMF may send an NG setup response to the base station 105 in response. In some examples, NAS signaling may correspond to signaling or information exchange between the UE 115 and the core network nodes (e.g., an core network entity), and access stratum (AS) signaling may correspond to signaling or information exchange between the UE 115 and the radio network (e.g., a network providing LTE or NR services).

A UE 115 may send an RRC message, such as an RRC Message 5, to the base station 105 105. The information in the RRC Message 5 may be used for AMF selection and may be a subset of NAS requested-NSSAI based on a security of the RRC Message 5. In some cases, the RRC message may include, for example, a request NSSAI (e.g., AS-Requested-NSSAI) or a NAS registration request (e.g., Request-NSSAI), or both. The base station 105 may send, to the AMF, an initial UE message including a NAS registration request. The AMF may send an initial UE context setup request to the base station 105, including an allowed NSSAI, NAS registration accept information, or both. For example, the AMF may indicate allowed NSSAIs or rejected NSSAIs for the UE 115. The allowed NSSAI may include a minimal common set of a requested NSSAI, or a default S-NSSAIs if no valid S-NSSAIs are requested, a subscribed NSSAI, and a current TAI supported NSSAI. The UE 115 and the base station 105 may exchange a security mode command, and the base station 105 may send an RRC reconfiguration to the UE 115 indicating the NAS registration acceptance.

After the NAS registration procedure, the UE 115, the base station 105, and the AMF may each have a UE context for the UE 115. The UE context at the UE 115 may include configured NSSAI, requested NSSAI, allowed NSSAI, rejected NSSAI, or any combination thereof. The UE context at the base station 105 may include allowed NSSAI, NSSAI of active protocol data unit (PDU) sessions, or both. The UE context at the AMF may include subscribed NSSAI, requested NSSAI, allowed NSSAI, rejected NSSAI, or any combination thereof. In some cases, a PDU session establishment may be associated with a slice in the allowed NSSAI. In some cases, network slice support may be uniform in a tracking area.

Some wireless communications systems that implement network slicing may use cell-specific RACH resources and configurations for RACH procedures. These techniques of other different wireless communications systems may not provide techniques for network slice-aware RACH procedure. Therefore, a UE 115 in these systems may use a same RACH configuration for each network slice regardless of a priority of each network slice. As such, the UE 115 may perform a RACH procedure for a higher priority network slice using a same configuration and RACH parameters as other, lower priority network slices, which may delay success of the RACH procedure for the urgent network slice.

The wireless communications system 100, as well as other wireless communications systems described herein, may implement techniques to support slice-based RACH procedure types. For example, the wireless communications system 100 may support configuring a UE 115 with supporting network slicing. Slice-specific RACH parameters may be prioritized and configured per network slice or per network slice group. The UE 115 may be configured with network slice priority (e.g., a priority for a network slice) via RRC signaling, system information (e.g., via a system information block (SIB)), NAS signaling, or any combination thereof. Through RRC signaling or a SIB, some network slices may be configured with isolated RACH resources or prioritized RACH parameters. In some cases, the prioritized RACH parameters may be different from cell-specific RACH parameters. When traffic arrives at the UE 115 to trigger a RACH procedure, the NAS of the UE 115 may indicate a network slice identity to the access stratum (AS) of the UE 115. The AS of the UE 115 may select corresponding RACH resources and parameters for RACH access.

For example, a base station 105 may transmit, to a UE 115, an indication of a configuration for a set of RACH procedure types, for example, for a BWP of the UE 115. Each RACH procedure type in the set of RACH procedure types may be different from at least some if not all of the other RACH procedure types in the set of RACH procedure types. The base station 105 may transmit, to the UE 115, a trigger to perform a RACH procedure type for a network slice. The base station 105 may perform the RACH procedure for the network slice according to a RACH procedure type selected by the UE from the set of RACH procedure types based at least in part on the indication of the configuration for the set of RACH procedure types and on the trigger.

The UE 115 may receive an indication of a configuration for a set of RACH procedure types, for example, for a BWP of the UE 115. Each RACH procedure type in the set of RACH procedure types may be different from at least some if not all of the other RACH procedure types in the set of RACH procedure types. The UE 115 may select a RACH procedure type from the set of RACH procedure types for the RACH procedure based at least in part on the indication of the configuration for the set of RACH procedure types and on a trigger to perform a RACH procedure for a network slice. The UE 115 may perform the RACH procedure for the network slice according to the RACH procedure type.

Figure 2:
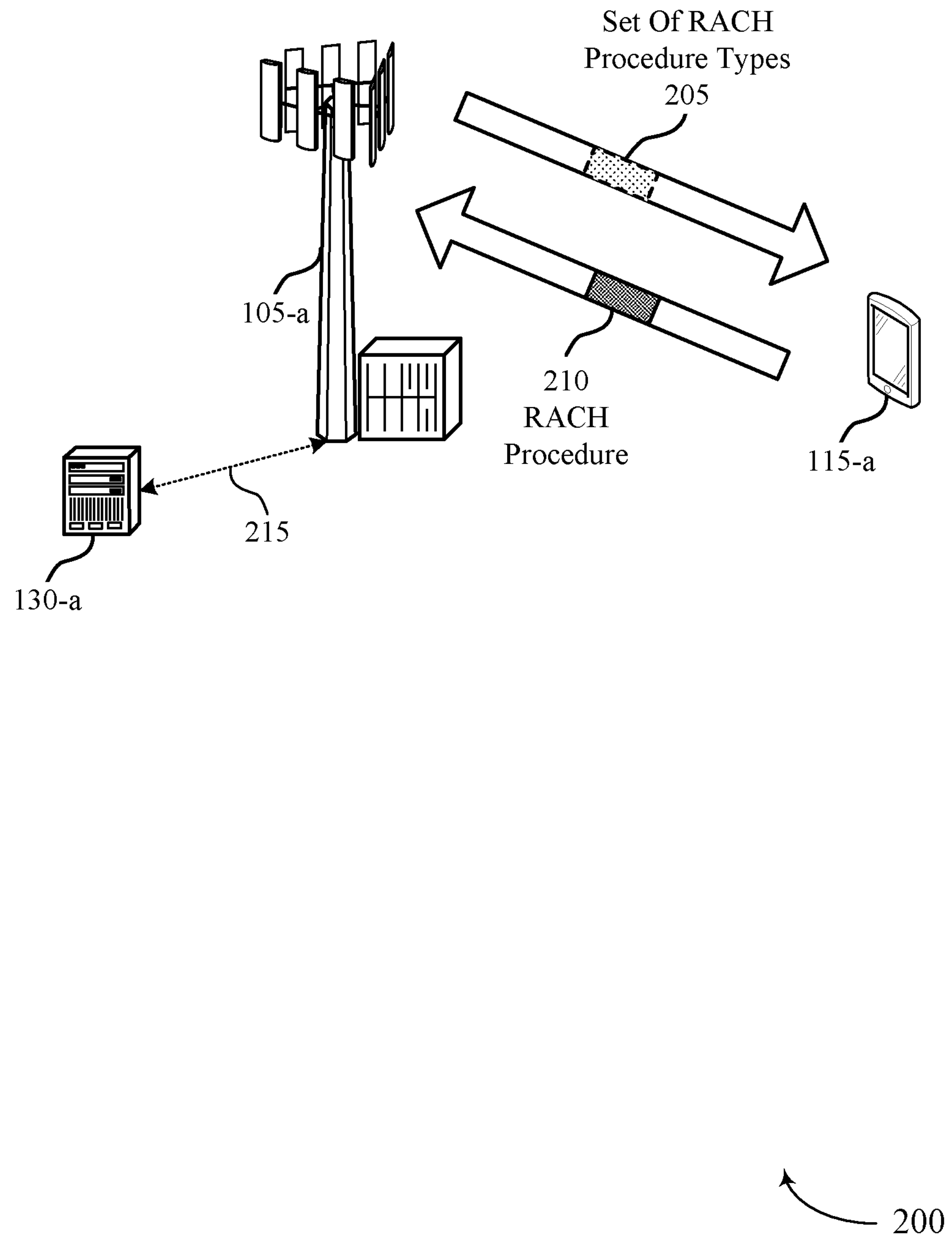
FIG. 2 illustrates an example of a wireless communications system that supports RACH type selection and fallback mechanisms related to slicing in accordance with aspects of the present disclosure.

FIG. 2 illustrates an example of a wireless communications system 200 that supports RACH selection and fallback mechanisms related to slicing in accordance with aspects of the present disclosure. The wireless communications system 200 may be an example of, or implement aspects of, the wireless communications system 100. The wireless communications system 200 may include a UE 115-*a* and a base station 105-*a*, which may be respective examples of a UE 115 and a base station 105 as described with reference to FIG. 1. The wireless communications system 200 may include a network entity 130-*a*, which may include aspects of an entity for a core network 130 or an AMF as described with reference to FIG. 1.

The wireless communications system 200 may support network slicing. For example, the UE 115-*a* may be configured with one or more network slices. A network slice may be associated with one or more access categories, access identities, services, security configurations, or any combination thereof. In some cases, the UE 115-*a* may be configured with multiple network slices, which may each provide a virtual network using common infrastructure within the wireless communications system 200. In some cases, network slices may be configured at the UE 115-*a* using a NAS registration procedure, such as the procedure described with reference to FIG. 1. In some cases, the base station 105-*b* may receive, from the network entity 130-*a* over a link 215, a configuration for one or more network slices, a configuration for one or more sets of RACH prioritization parameters, or one or more priorities corresponding to the one or more sets of RACH prioritization parameters, a set of RACH procedure types, or some combination thereof.

The UE 115-*a* may be configured a set of RACH procedure types for performing RACH procedures in order to establish a connection with base station 105-*a*. For example, the base station 105-*a* may transmit an indication of a set of RACH procedure types 205 to the UE 115-*a*. In the set of RACH procedure types, each RACH procedure type may be associated with resource(s) that are non-overlapping with respect to resource(s) of the other RACH procedure types in the configured set of RACH procedure types. In some cases, the set of RACH procedure types may be configured via RRC signaling, a SIB, a MAC CE signaling, higher layer signaling, or any combination thereof. Each RACH procedure types may be associated with a specific type of RACH procedure that may be applied to a RACH procedure between UE 115-*a* and base station 105-*a*. For example, the set of RACH procedure types may define a two-step CFRA RACH procedure type, a four-step CFRA RACH procedure type, a two-step slice-based RACH procedure type, a four-step slice-based RACH procedure type, a two-step common RACH procedure type, or a four-step common RACH procedure type, or one or more other RACH procedure types, or any combination thereof in one BWP. Configuring the UE 115-*a* with the set of RACH procedure types may provide flexibility for performing RACH procedures. For example, the UE 115-*a* may be configured with multiple RACH procedure types, where at least some RACH procedure types may be associated with slice-based RACH procedures (e.g., utilized when the UE is triggered with a network slice having a relatively higher priority level that may be above a priority level threshold).

In some examples, the set of RACH procedure types may include different configurations of the RACH procedure types. In some examples, this may include a two-step CFRA RACH procedure type not being configured together with a four-step CFRA RACH procedure type in the set of RACH procedure types. In some examples, this may include the two-step slice-based RACH procedure type and the four-step slice-based RACH procedure type being configured together in the set of RACH procedure types in one BWP. In some examples, this may include, when the two-step and four-step slice-based RACH procedure types are included in the set of RACH procedure types, the two-step and/or four-step common RACH procedure types being included in the set of RACH procedure types in one BWP (e.g., the network may provide the common RACH procedure types to support legacy UE(s)). When the two-step and four-step slice-based RACH procedure types are included in the set, in some examples a single one of the two-step or four-step common RACH procedure types may be included in the set of RACH procedure types (e.g., to improve efficiency). Broadly, each RACH procedure type in the configured set of RACH procedure types may be associated with a resource (e.g., which may include various time resource(s), frequency resource(s), spatial resource(s), code resource(s), and the like) the may be used for the RACH procedure. In some examples, the resources (e.g., RACH opportunity/occasion and/or RACH preamble) of the RACH procedure types in the configured set of RACH procedure types may be non-overlapping with respect to the resources of the other RACH procedure types in the configured set of RACH procedure types.

The UE 115-*a* may implement techniques to select a set of RACH prioritization parameters from the multiple configured sets of RACH prioritization parameters to perform a RACH procedure. For example, when the UE 115-*a* is configured to perform a RACH procedure for an arriving network slice, the UE 115-*a* may select one of the sets of RACH prioritization parameters to perform the RACH procedure. Broadly, the network slice may correspond to a network slice assistance information, a single network slice selection assistance information, a slice type, a service type, a set of single network slice selection assistance information, other information, or any combination thereof. In some examples, the network slice may be associated with the priority level.

The network slice may be triggered for uplink data in some examples. For example, UE 115-*a* may be operating in an RRC idle or RRC inactive state when the network slice is triggered. In this context, the RACH procedure may be utilized to establish a connection with base station 105-*a* to communicate the uplink data. For example, UE 115-*a* may identify or otherwise select the RACH procedure type for uplink data received, for example, in a buffer of UE 115-*a*, which may trigger the RACH procedure to establish the connection to communicate the uplink data to base station 105-*a*. It is to be understood that the network slice may be associated with downlink data according to the techniques discussed herein.

In some aspects, UE 115-*a* may be operating in an RRC connected state, but may not be configured with PUCCH resources to use to transmit a scheduling request to base station 105-*a* in order to establish the connection. Or, UE 115-*a* may be operating in an RRC connected state, but may not be uplink synchronized with base station 105-*a* when the network slice is triggered. This may mean that UE 115-*a* needs to perform the RACH procedure in order to establish, or update, or synchronize the RRC connection with base station 105-*a*. Accordingly, UE 115-*a* may select the RACH procedure type from the configured set of RACH procedure types to use for the RACH procedure to establish the connection to communicate the uplink data.

In response to the triggered network slice, UE 115-*a* may select a RACH procedure type from the configured set of RACH procedure types based on which RACH procedure types are included in the set of RACH procedure types. Different cases may be utilized in accordance with aspects of the described techniques.

Some examples may include UE 115-*a* identifying or otherwise determining that the configured set of RACH procedure types includes at least a two-step CFRA RACH procedure type, a two-step slice-based RACH procedure type, and a two-step common RACH procedure type in one BWP. In this case, UE 115-*a* may select the two-step CFRA RACH procedure type for the RACH procedure. For example, UE 115-*a* may receive a synchronization signal (e.g., CSI-RS, SSB, etc.) from base station 105-*a* at a receive power level (e.g., RSRP) that satisfies a threshold receive power level. Based on the synchronization signal satisfying the threshold and the network slice being triggered, UE 115-*a* may determine that the two-step CFRA RACH procedure type may be the most appropriate RACH procedure to utilize to establish the connection for communicating the network slice. In the situation where UE 115-*a* determines that the receive power level of the synchronization signal does not satisfy the threshold receive power level, then UE 115-*a* may select the two-step slice-based RACH procedure type for the RACH procedure. In the situation where a threshold number of attempts of the RACH procedure is unsuccessful, UE 115-*a* may perform a fallback RACH procedure, which may in some examples include using a four-step RACH procedure type included in the configured set of RACH procedure types (if included).

That is, in this case the network may at least configure the two-step slice-based RACH procedure type and the two-step common RACH procedure type in the same BWP, with the four-step RACH procedure type being optionally configured and included in the set. The network may also configure a fallback attempt number (N) if the four-step RACH procedure type is included in the set for the BWP. UE 115-*a* may perform the two-step CFRA if, for example, the qualified SSB beam is detected (e.g., RSRP greater than a configured threshold). Otherwise, UE 115-*a* may pick or otherwise select the two-step slice-based RACH procedure type for the RACH procedure. In the fallback situation, if the four-step slice-based RACH procedure type is configured in the set for the BWP, and the number of MsgA transmission satisfies the threshold (e.g., N, if configured), then UE 115-*a* may switch to Msg1 of a four-step slice-based RACH procedure type. Otherwise, if the four-step common RACH procedure type is included in the set for the BWP and the number of MsgA transmission satisfies a threshold (e.g., N, if configured), then UE 115-*a* may switch to Msg1 of a four-step common RACH procedure type for the RACH procedure.

In other examples, UE 115-*a* may identify or otherwise determine that the configured set of RACH procedure types includes at least a four-step CFRA RACH procedure type, a four-step slice-based RACH procedure type, and a four-step common RACH procedure type. In this situation, UE 115-*a* may identify or otherwise select the four-step CFRA RACH procedure type for the RACH procedure. This may be based on UE 115-*a* determining that the receive power level of the synchronization signal (e.g., CSI-RS, SSB, etc.) satisfies the threshold receive power level. In response to the network slice being triggered and the RSRP of the SSB being greater than a threshold, UE 115-*a* may select the four-step CFRA RACH procedure type. In the situation where UE 115-*a* identifies or otherwise determines that the receive power level of the synchronization signal does not satisfy the threshold receive power level, UE 115-*a* may instead select the four-step slice-based RACH procedure type for the RACH procedure.

That is, in this case the network may at least configure the four-step slice-based RACH procedure type and the four-step common RACH procedure type in the same BWP for UE 115-*a*. The network may, in some examples, not configure (e.g., be constrained) the set of RACH procedure types to include any two-step RACH procedure types. Accordingly, UE 115-*a* may perform the four-step CFRA RACH procedure type if the qualified SSB beam is detected (e.g., RSRP greater than a configured threshold). Otherwise, UE 115-*e* may select a four-step slice-based RACH procedure type when the qualified SSB beam is detected at an RSRP level less than the configured threshold. In some aspects, this case may not include a fallback switch configured for UE 115-*a*.

In other examples, UE 115-*a* may identify or otherwise determine that the configured set of RACH procedure types includes a two-step slice-based RACH procedure type and a four-step common RACH procedure type in the same BWP. In this situation, UE 115-*a* may identify or otherwise select the two-step slice-based RACH procedure type for the RACH procedure. In the situation where a threshold number of attempts (e.g., N, if configured) for the RACH procedure using the two-step slice-based RACH procedure type is unsuccessful, UE 115-*a* may perform a fallback RACH procedure, for example, using a four-step common RACH procedure type.

That is, in this case network may not configure or otherwise include a CFRA RACH procedure type in the configured set of RACH procedure types. Instead, the network may configure the two-step slice-based RACH procedure type and the four-step common RACH procedure type in the BWP for UE 115-*a*. In the configuration, the network may also include the fallback attempt number (e.g., N). In some aspects, N may be slice specific or slice common (e.g., may reuse legacy RSRP threshold and N values). Accordingly, in this case UE 115-*a* may be configured to attempt to perform the RACH procedure using the two-step slice-based RACH procedure type, at least for N attempts. If the number of MsgA transmissions satisfies the threshold (e.g., N, when configured), UE 115-*a* may switch to Msg1 of the four-step common RACH procedure type and again attempt to perform the RACH procedure.

In other examples, UE 115-*a* may identify or otherwise determine that the configured set of RACH procedure types includes at least a two-step slice-based RACH procedure type, a four-step slice-based RACH procedure type, and a four-step common RACH procedure type. In this situation, UE 115-*a* may identify or otherwise select the two-step slice-based RACH procedure type for the RACH procedure. For example, UE 115-*a* may determine that the receive power level of a synchronization signal (e.g., the RSRP of a CSI-RS, SSB, etc.) satisfies the threshold receive power level. Based on the RSRP value and the network slice being triggered, UE 115-*a* may select the two-step slice-based RACH procedure type for the RACH procedure. In the situation where the receive power level of the synchronization signal fails to satisfy the threshold receive power level, UE 115-*a* may instead select a four-step slice-based RACH procedure type for the RACH procedure. If UE 115-*a* determines that the RACH procedure was unsuccessful after a threshold number of attempts, UE 115-*a* may perform a fallback RACH procedure using the four-step slice-based RACH procedure type.

That is, in some examples the network (e.g., base station 105-*a*) may not configure the two-step or four-step CFRA RACH procedure types in the set. Instead, the network may include the two-step slice-based RACH procedure type, the four-step slice-based RACH procedure type, and a four-step common RACH procedure type in the same BWP for UE 115-*a*. In some aspects, the network may also configure an RSRP threshold (e.g., the threshold receive power level) for the RACH procedure type selection, as well as a fallback number (e.g., N) before the fallback procedure is implemented. In some aspects, the RSRP threshold and/or the threshold number of attempts (e.g., N) may be slice specific (e.g., may be specifically configured for an individual slice or each of a set of multiple slices) or slice common (e.g., may reuse legacy RSRP thresholds and N values, may be specifically configured for multiple slices). Accordingly in this case UE 115-*a* may, if the RSRP of the downlink pathloss reference (e.g., SSB) is above a threshold, identify or otherwise select the two-step slice-based RACH procedure type for the RACH procedure. Otherwise (e.g., if the downlink pathloss reference is not above or otherwise fails to satisfy the threshold), UE 115-*a* may identify or otherwise select the four-step slice-based RACH procedure type for the RACH procedure. As a fallback, if the number of MsgA transmissions satisfies the threshold (e.g., N, if configured), UE 115-*a* may, for example, switch to Msg1 of the four-step slice-based RACH procedure type for the RACH procedure.

In some other examples, UE 115-*a* may identify or otherwise determine that the configured set of RACH procedure types includes a four-step slice-based RACH procedure type, a two-step common RACH procedure type, and/or a four-step common RACH procedure type. In this situation, UE 115-*a* may identify or otherwise select a four-step slice-based RACH procedure type for the RACH procedure and may refrain from performing a fallback RACH procedure using the two-step common RACH procedure type or the four-step common RACH procedure type (e.g., there may be no fallback RACH procedure configured in this case).

That is, in this case the network may not include a two-step CFRA RACH procedure type or a four-step CFRA RACH procedure type in the set of RACH procedure types configured for UE 115-*a*. Instead, the network may configure the four-step slice-based RACH procedure type and a two-step common RACH procedure type in the same BWP for UE 115-*a*. In this situation, UE 115-*a* may always perform the RACH procedure using the four-step slice-based RACH procedure type included in the configured set of RACH procedure types.

That is, the UE 115-*a* may be triggered to perform a RACH procedure and select a RACH procedure type from the configured set of RACH procedure types based on the trigger. When the RACH procedure is triggered, a NAS of the UE 115-*a* may indicate a set of information to an AS of the UE 115-*a*. For example, the NAS may indicate one or more slice identifiers, one or more slice group identifiers, one or more access category identifiers, one or more access category group identifiers, one or more access identity identifiers, one or more access identity group identifiers, one or more RACH prioritization parameter set identifiers, a set of RACH procedure types, or any combination thereof. In some aspects of this case, the network may configure UE 115-*a* with the four-step slice-based RACH procedure type and a four-step common RACH procedure type in the same BWP. In that situation, UE 115-*a* may select a four-step slice-based RACH procedure type for the RACH procedure based on the network slice being triggered. That is, in some aspects of this case, UE 115-*a* may identify or otherwise select the slice-based RACH procedure type (two-step or four-step) for the RACH procedure in response to the network slice being triggered.

In some other examples, UE 115-*a* may identify or otherwise determine that the configured set of RACH procedure types includes a two-step slice-based RACH procedure type, a two-step common RACH procedure type, a four-step slice-based RACH procedure type, and a four-step common RACH procedure type. In this situation, UE 115-*a* may select the two-step slice-based RACH procedure type for the RACH procedure. For example, UE 115-*a* may identify or otherwise determine that the receive power level of a synchronization signal satisfies a threshold receive power level. Based on the receive power level of the synchronization signal and the network slice being triggered, UE 115-*a* may identify or otherwise select the two-step slice-based RACH procedure type for the RACH procedure. In the situation where UE 115-*a* determines that the receive power level of the synchronization signal fails to satisfy the threshold receive power level, UE 115-*a* may instead select the four-step slice-based RACH procedure type for the RACH procedure. If UE 115-*a* determines that the RACH procedure was unsuccessful after a threshold number of attempts (e.g., N, if configured), then UE 115-*a* may, for example, perform a fallback RACH procedure using the four-step slice-based RACH procedure type.

That is, in this case the network may not configure a two-step CFRA RACH procedure type or a four-step CFRA RACH procedure type for UE 115-*a*. Instead, the network may include the two-step slice-based RACH procedure type, the two-step common RACH procedure type, a four-step slice-based RACH procedure type, and the four-step common RACH procedure type for the same BWP in the configured set of RACH procedure types. The network may also configure the RSRP threshold for RACH type selection, as well as the fallback attempt number (e.g., N). Again, the RSRP threshold and N may be slice specific or slice common (e.g., may reuse legacy RSRP threshold and N values). If the RSRP of the downlink pathloss reference (e.g., if the receive power level of the synchronization signal) is above a threshold (e.g., satisfies the threshold receive power level), then UE 115-*a* may perform the RACH procedure using the two-step slice-based RACH procedure type. Otherwise (e.g., if the receipt power level of the synchronization signal fails to satisfy the threshold), UE 115-*a* may perform the RACH procedure using the four-step slice-based RACH procedure. In the fallback situation, if UE 115-*a* determines that the number of MsgA transmissions reaches a threshold (e.g., N, if configured), then UE 115-*a* may switch to a Msg1 transmission of the four-step slice-based RACH procedure type.

In some situations, UE 115-*a* and base station 105-*a* may already be performing a RACH procedure when the network slice is triggered. For example, UE 115-*a* may identify or otherwise determine that a second RACH procedure (e.g., the ongoing RACH procedure) is being performed separate from the RACH procedure to be performed for the network slice that has been triggered. Generally, UE 115-*a* may cancel the second RACH procedure (e.g., the ongoing RACH procedure) in order to perform the RACH procedure using the selected RACH procedure type (e.g., according to the techniques discussed herein) based on the priority level of the network slice being a higher priority level than the priority level associated with the second RACH procedure.

That is, if the new RACH procedure is triggered by traffic (e.g., such as the network slice being triggered), and there is an ongoing RACH procedure (e.g., the second RACH procedure), UE 115-*a* and/or base station 105-*a* may use the priority levels to determine next steps. For example, if the slice priority of the new RACH procedure is higher than the priority level of the ongoing RACH procedure, UE 115-*a* may cancel or otherwise abort the ongoing RACH procedure and instead start a new RACH procedure using a RACH procedure type selected in accordance with the techniques discussed herein. However, if the slice priority of the new RACH procedure is not a higher priority level than the ongoing RACH procedure, then UE 115-*a* may suspend the new RACH procedure (e.g., continue with the ongoing RACH procedure and not perform or start a new RACH procedure for the triggered slice). In some aspects, a RACH procedure that is not triggered by traffic may be regarded as having a higher priority level.

In the situation where a non-urgent network slice (e.g., a network slice having a low priority level) has been triggered, UE 115-*a* may generally adopt a RACH procedure type selection that defaults to the two-step or four-step common RACH procedure types. That is, even if the configured set of RACH procedure types includes slice-based RACH procedure types, UE 115-*a* may not use the slice-based RACH procedure types and, instead, may fall back to a two-step or four-step common RACH procedure type for the low priority network slice traffic.

UE 115-*a* may perform the RACH procedure in accordance with the selected RACH procedure type. For example, the UE 115-*a* may send RACH procedure signaling 210 to the base station 105-*a* and receive RACH procedure signaling from the base station 105-*a*. The UE 115-*a* may perform the RACH procedure according to, for example, a two-step or four-step slice-based RACH procedure type, a two-step or four-step CFRA RACH procedure type, or a two-step or four-step common RACH procedure type, utilizing the RACH procedure type selection techniques discussed herein. This may provide the UE 115-*a* to perform the RACH procedure using slice-aware RACH resources, increasing a likelihood of a successful RACH procedure. The UE 115-*a* may complete the RACH procedure and establish or re-establish an RRC connection with base station 105-*a* based on the completion.

Figure 3:
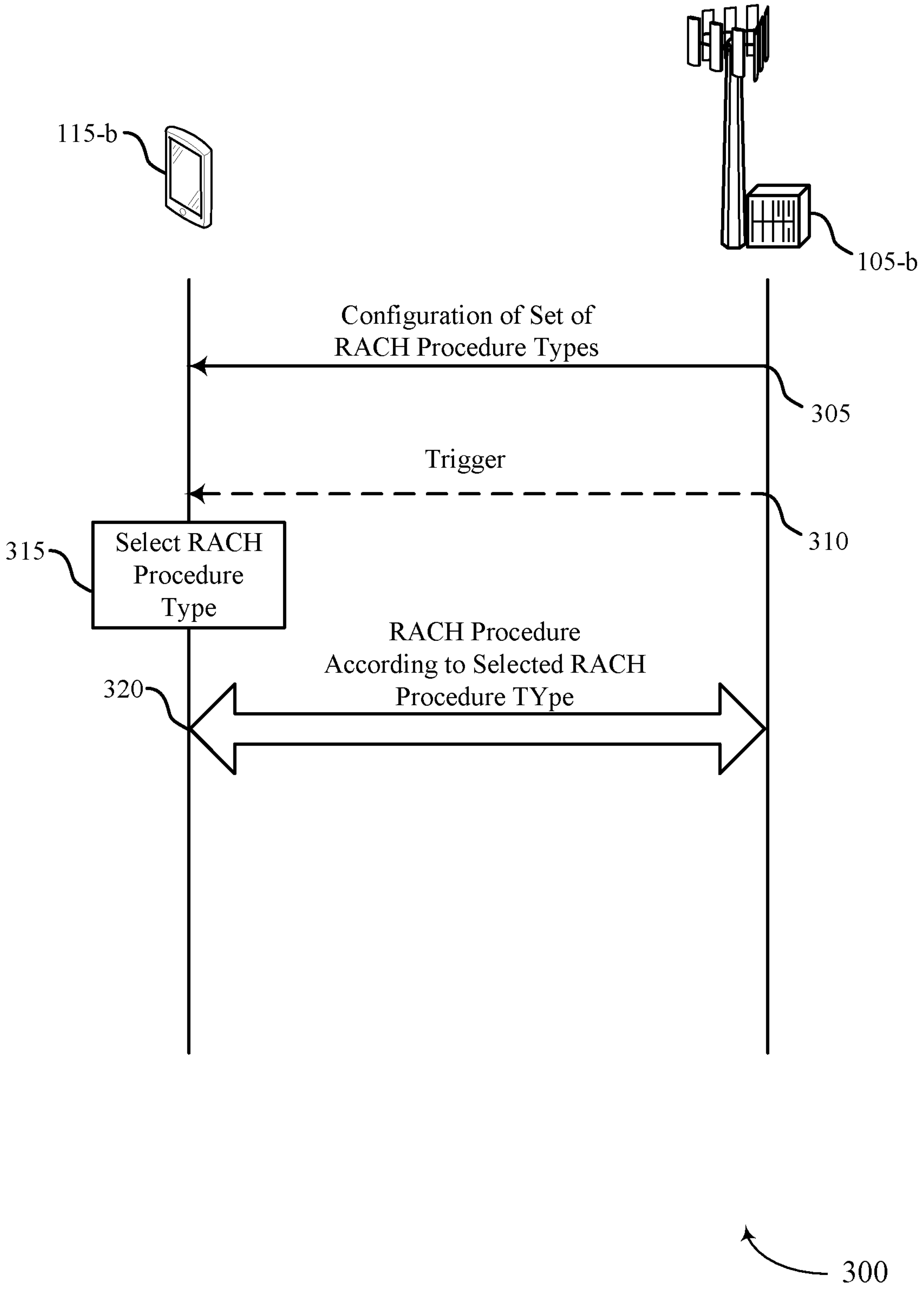
FIG. 3 illustrates an example of a process flow that supports RACH type selection and fallback mechanisms related to slicing in accordance with aspects of the present disclosure.

FIG. 3 illustrates an example of a process flow 300 that supports RACH type selection and fallback mechanisms related to slicing in accordance with aspects of the present disclosure. The process flow 300 may be implemented by a UE 115-*b*, or a base station 105-*b*, or both, which may be respective examples of a UE 115 and a base station 105 as described with reference to FIGS. 1 and 2. In some cases, some operations or signaling of the process flow 300 may occur in a different order than shown by FIG. 3. Additionally, some operations or signaling may be additionally performed, or some shown operations or signaling may not be performed and may be omitted.

At 305, the base station 105-*b* may transmit or otherwise provide (and UE 115-*b* may receive or otherwise obtain) an indication of a configuration for a set of RACH procedure types for a BWP of UE 115-*b*. Broadly, each RACH procedure type in the set of RACH procedure types may be different (e.g., unique) from the other RACH procedure types in the set of RACH procedure types. In some aspects, each RACH procedure type in the configured set of RACH procedure types may have an associated resource (e.g., time resource(s), frequency resource(s), spatial resource(s), code resource(s), etc.) that is different from (e.g., non-overlapping) the resource of the other RACH procedure types in the configured set of RACH procedure types. In some aspects, base station 105-*b* may transmit or otherwise provide the indication of the configuration, for example, via RRC signaling, MAC CE signaling, DCI signaling, or other higher layer signaling.

At 310, base station 105-*b* may transmit or otherwise provide (and UE 115-*b* may receive or otherwise obtain) a trigger for UE 115-*b* to perform a RACH procedure for a network slice. In some aspects, the trigger provided at 310 may be optional and may be associated with the network slice being triggered for UE 115-*b* being associated with downlink data. However, in other examples UE 115-*b* may autonomously identify or otherwise determine that the trigger for the network slice has occurred. For example, the network slice may be associated with uplink data to be transmitted by UE 115-*b* to base station 105-*b*. For example, UE 115-*b* may be operating in an RRC idle or inactive state when the uplink data arrives at the buffer of UE 115-*b*. In this situation, the RACH procedure may be performed to enable UE 115-*b* to reestablish/reestablish an active connection with base station 105-*b* in order to communicate the uplink data. In another example, UE 115-*b* may be operating in an RRC active state with base station 105-*b*, but may not have uplink synchronization with base station 105-*b* and/or may not be configured with a set of PUCCH resources to use for transmitting a scheduling request. In this situation, the RACH procedure may be performed to update (e.g., synchronize) the RRC connection between UE 115-*b* and base station 105-*b*.

At 315, UE 115-*b* may identify or otherwise select a RACH procedure type from the set of RACH procedure types to use for the RACH procedure. Broadly, the selected RACH procedure type may be based on the trigger to perform the RACH procedure for the network slice as well as the configured set of RACH procedure types (e.g., may depend on which RACH procedure types are included in the set of RACH procedure types). As discussed above with reference to FIG. 2, various selection schemes may be utilized for the RACH procedure type selection in accordance with the described techniques. In some examples, the RACH procedure type selection scheme may be based on whether or not a synchronization signal (e.g., CSI-RS, SSB, etc.) is received, and for example whether or not a synchronization signal is receive at a threshold receive power level. The RACH procedure type selection scheme may include a fallback mechanism whereby UE 115-*b* may select a different RACH procedure type if N attempts of the RACH procedure using the initially selected RACH procedure type(s) is(are) unsuccessful. As discussed above, examples of the RACH procedure types that may be included in the set of RACH procedure types include, but are not limited to, a two-step CFRA RACH procedure type, a four-step CFRA RACH procedure type, a two-step slice-based RACH procedure type, a four-step slice-based RACH procedure type, a two-step common RACH procedure type, and/or a four-step common RACH procedure to. In the situation where the two-step slice-based RACH procedure type and the four-step slice-based RACH procedure type are included in the set, in some examples the network may configure either the two-step common RACH procedure type or the four-step common RACH procedure type (e.g., for efficiency).

At 320, UE 115-*b* and base station 105-*b* may perform the RACH procedure for the network slice according to the selected RACH procedure type. For example, UE 115-*b* may initially select a two-step RACH procedure type for the RACH procedure, which may include UE 115-*a* transmitting a RACH MsgA to base station 105-*b*, with base station 105-*b* responding by transmitting a RACH MsgB. In another example, UE 115-*b* may initially select a four-step RACH procedure type for the RACH procedure, which may include UE 115-*b* transmitting a RACH Msg1, base station 105-*b* responding by transmitting the RACH Msg2, UE 115-*b* responding to the RACH Msg2 by transmitting a RACH Msg3, and base station 105-*b* responding to the RACH Msg3 by transmitting a RACH Msg4. In some examples (e.g., when configured), the initial RACH procedure type selection may be based on the receive power level of the synchronization signal satisfying a threshold. For example, if the receive power level of the synchronization signal fails to satisfy the threshold, UE 115-*b* may select a different RACH procedure type from the configured set of RACH procedure types. After N unsuccessful attempts (e.g., when configured) using either initially selected RACH procedure type (e.g., based on the RSRP of SSB), UE 115-*b* may perform a fallback RACH procedure using a different RACH procedure type from the set of RACH procedure types (e.g., when configured).

Accordingly, aspects of the described techniques support slice-specific RACH procedures. Such techniques enhance RAN support of network slicing. The techniques described herein support slice based RACH configuration (e.g., specify mechanisms and signaling including, for Mobile Originating cases). Some examples may include configuring separate PRACH configuration (e.g., transmission occasions of time-frequency domain and/or preambles) for a slice and/or slice group. Some examples may include configuring RACH parameters prioritization (e.g., scalingFactorBI and powerRampingStepHighPriority) for a slice and/or slice group. Some examples may include determining how this works (e.g., slice-based RACH) with other different (e.g., existing) functionality, which may include how to perform RACH type selection (e.g., two-step and four-step), support of RACH fallback cases, handling of simultaneous configuration with similar functions such as legacy RA prioritization (e.g., MPS and MCS UEs). Such techniques may provide RAN slicing enhancements in given cells that does not prevent accessibility for legacy UEs (e.g., such as for Rel-15 and Rel-16 UEs).

Some examples of the described techniques may be limited to considering slice specific RACH triggered by a mobile originated (MO) case. For example, this may support slice based RACH configuration, specify mechanisms and signaling including, for MO cases. However, certain aspects may consider what is a "MO case" (e.g., does it include MO signaling or data traffic). Although it captured that the intended slice may refer to the S-NSSAI associated with MO traffic, in some examples this may include MO signaling and/or data traffic in case of MO traffic, the intended slice means the S-NSSAI associated with MO traffic based on indication from NAS to AS. For MO service, the UE is aware of the intended slice. Although some aspects may apply to slice specific RACH triggered by MO traffic, in such examples this may include MO signaling and/or data traffic.

Accordingly, in some aspects of these techniques may be applied to MO data traffic due to MO signaling (e.g. TAU) triggered slice specific RACH may not be reasonable in some scenarios. For example, one area (Area 1) may be associated with eMBB slice priority of F1>F2 and URLLC slice priority of F2>F1. In this area, cell one may use frequency range two (FR2) at 4.9 GHz for eMBB and URLLC. In this area, cell two may use frequency range one (FR1) at 2.6 GHz for eMBB. In another area (Area 2) may be associated with eMBB slice priority F2>F1 and may not support URLLC slicing. In this second area, cell three may use F2 at 4.9 GHz for eMBB and cell four may use F1 at 2.6 GHz for eMBB. Assuming one UE supports both eMBB and URLCC slices, and the UE moves from Area 1 to Area 2 where Area 1 and Area 2 belong to different TA. In Area 1, if URLLC data traffic arrives at the UE, it makes sense for the UE to use isolated RACH resource for URLCC in cell 1 to reduce access latency. When the UE moves to Area 2 in different TA, it needs to trigger RACH procedure for TAU. Then, if MO signaling can trigger slice specific RACH, the UE may use isolated RACH resource for URLCC in cell 3. However, because URLCC is not supported in Cell 3, it doesn't make sense for the UE to use URLCC specific RACH resource. Thus, some examples of the described techniques may support MO data traffic. Accordingly, aspects of the described techniques may confirm that MO data arrival triggered RACH can apply slice specific RACH (e.g., MO signaling, such as TAU, triggered RACH may not be applied to slice-specific RACH, in some examples).

Aspects of the slice-based RACH configuration described herein may be applied to UE operating in RRC idle and RRC inactive states. That is, the techniques described herein may be applied to independently in a complimentary manner. If such techniques are deployed, it may also be beneficial that MO data traffic triggered RACH can be applied to UE operating in an RRC connected state in certain cases. Such cases may include, but are not limited to the random access procedure being triggered by a number of events, such as: initial access from RRC_IDLE; RRC connection reestablishment procedure; downlink or uplink data arrival during RRC_CONNECTED when UL synchronization status is "non-synchronized"; uplink data arrival during RRC_CONNECTED when there are no PUCCH resources for SR available; scheduling request failure; request by RRC upon synchronous reconfiguration (e.g. handover); transition from RRC_INACTIVE; to establish time alignment for a secondary TAG; request for Other SI; beam failure recovery; and/or consistent uplink LBT failure on SpCell. However, one related issue is that the S-NSSAI associated with MO data traffic may not be available for AS layer of CONNECTED UE. It may need to extend/update the definition of intended slice for MO traffic. Thus, aspects of the described techniques may support the CONNECTED UE can also apply slice specific RACH when RACH is triggered by MO data arrival (i.e. when UL synchronization status is "non-synchronized", or there are no PUCCH resources for scheduling request (SR) available, or SR failure).

With respect to signaling, when slice number is large this may cause issues for some techniques discussed herein (e.g., resource fragment for RACH resource isolation and too many prioritized parameters for the UE). Therefore, slice grouping may be necessary to be introduced. Some examples may introduce slicing grouping for slice specific RACH, but it is unclear whether to define a new grouping mechanism or reusing UAC access category. That is, slice group is supported for the techniques described herein. Whether to define a new grouping mechanism or reusing UAC access category may yet be determined. Accordingly, some examples of the techniques described herein may support defining a new grouping mechanism or reusing UAC access category. Some examples may include defining a new grouping mechanism from a set of S-NSSAIs to a slice group because reusing UAC access category may be problematic (e.g., may not be a clean solution). The access category was not designed to indicate slice information. So, there may not be a 1:1 mapping. Then, some slice information may not be derived if they belong to same access category (e.g. some paid/dedicated eMBB slices on top of common eMBB slices). Not all the S-NSSAIs belonging to one access category can be supported by a base station, which may cause a misunderstanding between UE and base station on the supported slice. Reusing UAC access category to configure slice grouping is not a clean solution because some slice information may not be derived if they belong to same AC and not all slices in one AC can be supported by the base station. Accordingly, in some examples the same slice grouping mechanism/signaling can be applied to both slice specific cell reselection and RACH. With regarding to detailed signaling of slice grouping, this may include the configuration signaling solutions via NAS, RRC or SIB. Other signaling techniques may also be supported. Accordingly and for both slice specific cell reselection and slice specific RACH, aspects of the described techniques may introduce a common slice grouping via a configured mapping from a set of S-NSSAIs to a slice group.

Another related issue is when the UE's intended slices include more than one S-NSSAIs (e.g. both eMBB and URLLC in area 1). In this situation, it may not be clear how the UE can determine the slice priority (e.g., leave it to UE implementation or request SA2/CT1 to introduce slice priority in NAS signaling). Due to lack of SA2/CT1 TU, some examples may leave it to UE implementation. Accordingly and due to lack of SA2/CT1 TU, it may be up to UE implementation to determine the slice priority if its intended slices includes more than one S-NSSAI.

Based on the techniques described herein, it may be MO data triggering slice specific RACH. Slice specific RACH (including RACH isolation and RACH prioritization) may be applied to CBRA, rather than CFRA, because CFRA is triggered in HO and BFR. Accordingly, some aspects may include slice specific RACH (including RACH isolation and RACH prioritization) being applied to CBRA rather than CFRA.

Some aspects may specify slice separated PRACH configuration (e.g., RACH isolation). Support slice based RACH configuration may include mechanisms and signaling including, for MO cases. This may include configure separate PRACH configuration (e.g., transmission occasions of time-frequency domain and preambles) for the slice or slice group. However, it is not clear what PRACH configuration can be slice separately configured. In a two-step RACH procedure, a separate information element (IE) RACH-ConfigCommonTwoStepRA can configure separate RO and preambles for two-step RACH.

```
RACH-ConfigCommonTwoStepRA-r16 ::=                        SEQUENCE {
  rach-ConfigGenericTwoStepRA-r16                           RACH-ConfigGenericTwoStepRA-r16,
  msgA-TotalNumberOfRA-Preambles-r16                          INTEGER (1..63)    OPTIONAL, -- Need S
  msgA-SSB-PerRACH-OccasionAndCB-PreamblesPerSSB-r16            CHOICE {
    oneEighth                                           ENUMERATED
{n4,n8,n12,n16,n20,n24,n28,n32,n36,n40,n44,n48,n52,n56,n60,n64},
    oneFourth                                           ENUMERATED
{n4,n8,n12,n16,n20,n24,n28,n32,n36,n40,n44,n48,n52,n56,n60,n64},
    oneHalf                                           ENUMERATED
{n4,n8,n12,n16,n20,n24,n28,n32,n36,n40,n44,n48,n52,n56,n60,n64},
    one                                           ENUMERATED
{n4,n8,n12,n16,n20,n24,n28,n32,n36,n40,n44,n48,n52,n56,n60,n64},
```

-continued

```
        two                                                  ENUMERATED {n4,n8,n12,n16,n20,n24,n28,n32},
        four                                                 INTEGER (1..16),
        eight                                                  INTEGER (1..8),
        sixteen                                                INTEGER (1..4)
    }                                                      OPTIONAL, -- Cond 2Steponly
    msgA-CB-PreamblesPerSSB-PerSharedRO-r16                             INTEGER (1..60)  OPTIONAL, -- Cond
SharedRO
```

That is, it may be considered that the same approach can be reused for slice specific RACH isolation (e.g., separated RO or preamble can be configured non-overlapping with the existing RACH-ConfigCommon and RACH-ConfigCommonTwoStepRA. This may leave the flexibility for the network to configure either separate RO or separate preamble for the specific slice or slice group. In some aspects, this may include a slice or a slice group, separated RO and/or preamble can be configured without overlapping with the existing RACH-ConfigCommon and RACH-ConfigCommonTwoStepRA.

Another important issue is how slice specific RACH isolation works with existing two-step, i.e. how to perform RACH type selection (e.g. selection between two-step and four-step RACH) and RACH fallback. This may include determining how this works with existing functionality, which may include how to perform RACH type selection (e.g., two-step and four-step), support of RACH fallback cases, handling of simultaneous configuration with similar functions such as legacy RA prioritization (e.g., MPS and MCS UEs).

Two-step RACH was introduced, which can send both Msg1 and Msg3 in MsgA to reduce latency of the RACH procedure. According to some examples, the RACH type selection and fallback mechanism can be summarized as follows: if two-step RACH resource is configured in one BWP, the UE shall perform the two-step RACH. If both two-step and four-step resource are configured in one BWP, the UE selects to perform two-step RACH or four-step RACH based on a cell specific RSRP threshold. If the number of MsgA transmissions reaches a threshold (if configured), the UE may switch to Msg1 of a four-step RACH (if configured in the same BWP).

As followed, for the delta part of slice specific RACH isolation with the legacy mechanism, the described techniques may include the configuration of four different types of RACH resource: two-step slice specific RACH resource (e.g., two-step slice-based RACH procedure type); four-step slice specific RACH resource (e.g., four-step slice-based RACH procedure type); two-step common RACH resource (e.g., two-step common RACH procedure type); and four-step common RACH resource (e.g., four-step common RACH procedure type).

Introduction of slice specific RACH resource may not prevent from accessibility for some Rel-15/Rel-16 legacy UEs. In addition, Rel-17 UEs supporting RACH isolation should also have non-urgent slice, i.e. the Rel-17 should not switch to another BWP to trigger common RACH when non-urgent slice traffic arrival. Thus, if slice specific RACH resource is configured in one BWP, common RACH resource is supported to be configured in the same BWP. In some aspects, slice specific RACH shall not prevent access of Rel-15/Rel-16 legacy UEs. In addition, Rel-17 UEs supporting RACH isolation should not switch to another BWP to trigger common RACH when non-urgent slice traffic arrival. To support legacy UE and non-urgent slice, if slice specific RACH resource is configured in one BWP, common RACH resource is may be configured in the same BWP. With regards to RACH type selection (between two-step RACH and four-step RACH), a legacy mechanism can be reused as a baseline. A specific issue may be to allow the UE to always to select two-step RACH in some cases, e.g. two-step RACH is preferred for URLLC related slice(s) to reduce RACH access latency. However, it can be achieved by principle with two-step slice RACH resource configured in the BWP, high priority slice may trigger two-step RACH to reduce latency. Following legacy mechanisms, if two-step slice RACH resource configured in the BWP, high priority slice may trigger two-step RACH to reduce latency. When both two-step and four-step slice specific RACH resource are configured in one BWP, the legacy mechanism based on RSRP can be reused. In some examples, another dedicated RSRP to urgent slice(s) can be introduced. Similarly, the legacy MsgA attempt number (e.g., N) based fallback mechanism can also be reused. Some examples may introduce another dedicated attempt number (e.g., N) threshold to urgent slice(s). Accordingly, such techniques may keep the principle of Rel-16 RACH type selection and fallback mechanism for slice specific RACH. Accordingly, aspects of the described techniques may keep the below principle of Rel-16 RACH type selection and fallback mechanism for slice specific RACH. If two-step RACH resource is configured in one BWP, the UE shall perform two-step RACH. If both two-step and four-step resource are configured in one BWP, the UE selects to perform two-step RACH or four-step RACH based on RSRP threshold. A slice (group) specific RSRP may be configured in some examples. Reuse access attempt number as condition to fallback from two-step RACH to four-step RACH. Some aspects of the described techniques may introduce a slice (group) specific attempt number threshold.

Finally, a few possible cases for RACH type selection and fallback of slice specific RACH are illustrated in Table 1 below, with two notes. The first note is that if Two-step slice specific RACH resource and four-step common RACH resource are configured in same BWP (i.e. case 1), the UE can fallback from two-step slice specific RACH to four-step common RACH. The second note is that if both four-step slice specific RACH resource and four-step common RACH resource are configured in same BWP (i.e. case 2 and case 5), the UE should fallback from two-step slice specific RACH to four-step slice specific RACH, and it is not necessary to introduce another fallback four-step slice specific RACH to four-step common RACH.

TABLE 1

| Cases | RACH resource configuration in one BWP | RACH type selection | Fallback after MSGA attempt number beyond threshold | Notes |
|---|---|---|---|---|
| Case 1 | 2-step slice specific RACH<br>4-step common RACH | Always perform 2-step slice specific RACH | UE switch to MSG1 of 4-step common RACH | Via only configuring 2-step slice RACH resource, high priority slice may only trigger 2-step RACH to reduce latency |
| Case 2 | 2-step slice specific RACH<br>4-step slice specific RACH<br>4-step common RACH | RACH type selection based on RSRP threshold | UE can switch to MSG1 of 4-step slice specific RACH | No fallback from 4-step slice specific RACH to 4-step common RACH |
| Case 3 | 4-step slice specific RACH<br>2-step common RACH | Always perform 4-step slice specific RACH | No fallback | |
| Case 4 | 4-step slice specific RACH<br>4-step common RACH | Always perform 4-step slice specific RACH | No fallback | |
| Case 5 | 2-step slice specific RACH<br>2-step common RACH<br>4-step slice specific RACH<br>4-step common RACH | RACH type selection based on RSRP threshold | UE can switch to MSG1 of 4-step slice specific RACH | Not preferred due to large RACH resource usage |

Accordingly, aspects of the described techniques may support at least the five cases illustrated in Table 1 being supported for RACH type selection and fallback of slice specific RACH.

In one objective of RAN slicing, it is clearly indicated to specify slice separated PRACH configuration specific RACH parameters prioritization (a.k.a. RACH prioritization). Support for slice based RACH configuration, specifying mechanisms and signaling, including for MO cases, may be provided herein. This may include configuring RACH parameters prioritization (e.g., scalingFactorBI and powerRampingStepHighPriority) for a slice or a slice group. However, it is not clear which RACH parameters can be separately configured for a slice or slice group.

In some examples, scalingFactorBI and powerRampingStepHighPriority can be configured with different value for prioritized RACH access in HO and BFR. Then, these two parameters can be separately configured for MCS and MPS triggered RACH. Following the same logic, slice specific RACH prioritization can also adopt these two parameters as baseline, and other parameters can be considered if time allows. Accordingly, aspects of the described techniques may include scalingFactorBI and powerRampingStepHighPriority are baseline of slice specific prioritized RACH parameters and other parameters can be considered if time allows.

Another important issue is how slice specific RACH prioritization works with existing RA prioritization for MPS/MCS, i.e. how to handle simultaneous configuration with more than one set of RA prioritization parameters (e.g. one MPS/MCS UE may be configured with two sets of prioritization parameters, one set for MPS/MCS and the other set for urgent slice arriving). This issue is captured in the following objective: determine how this works with existing functionality, which may include how to perform RACH type selection (e.g., two-step and four-step), support of RACH fallback cases, handling of simultaneous configuration with similar functions such as legacy RA prioritization (e.g., MPS and MCS UEs). The simplest solution is to specify some fixed prioritization rule, e.g. MPS/MCS always overrules slice/slice group. However, considering RAN2 is introducing RACH prioritization for different scenarios/cases ever from Rel-15 to Rel-17, specifying a flexible/configurable way may be a more forward compatible way. Specifically, a priority value can be configured for each RA prioritization parameters set (e.g. one set for MPS/MCS and another set for URLLC slice), and the UE's AS selects the set of RACH prioritization parameters with highest priority to perform RACH. This priority value can also be pre-configured via UE's subscription. Considering RAN2 is introducing RACH prioritization for different scenarios/cases ever from Rel-15 to Rel-17 (BFR/HO→MPS/MCS→Slice), specifying a flexible/configurable way is more forward compatible way. For each RA prioritization parameters set (e.g. one set for MPS/MCS and another set for URLLC slice), a priority value can be configured by the base station or pre-configured via UE's subscription. And the UE's AS selects the set of RACH prioritization parameters with highest priority to perform RACH.

Aspects of the described techniques introduce slice specific RACH, including scenario, its signaling and different design aspects for RACH isolation and RACH prioritization. In one scenario, this may include: limit scoping of slice specific RACH is triggered by MO traffic. However, it is not clear whether it includes MO signaling and/or data traffic and/or MO signaling (e.g. TAU) triggered slice specific RACH may not be reasonable in some scenario when the new camping cell doesn't support some UE's supported slice. Accordingly, the described techniques propose MO data arrival triggered RACH can apply slice specific RACH, i.e. MO signaling, such as TAU, triggered RACH is not applied to slice-specific RACH. The described techniques propose if the proposal above is agreed, these techniques may discuss whether a CONNECTED UE can also apply slice specific RACH when RACH is triggered by MO data arrival (i.e. when uplink synchronization status is "non-synchronized", or there are no PUCCH resources for SR available, or SR failure).

With regards to signaling, it is observed that section 5.2.2 of TR 38.832 has captured to introduce the slice grouping, and thereby it can be considered whether to define a new grouping mechanism or reusing UAC access category. It is observed that reusing UAC access category to configure slice grouping is not a clean solution because some slice information may not be derived if they belong to same AC and not all slices in one AC can be supported by base station. Accordingly, aspects of the described techniques propose for both slice specific cell reselection and slice specific RACH, introducing a common slice grouping via a configured mapping from a set of S-NSSAIs to a slice group. Further studying will detail signaling for slice grouping. Aspects of the described techniques propose, due to lack of SA2/CT1 TU, RAN2 may conclude it is up to UE implementation to determine the slice priority in this release if its intended slices includes more than one S-NSSAI.

For common aspects of RACH isolation and prioritization, the described techniques may propose RAN2 confirming that slice specific RACH (including RACH isolation and RACH prioritization) is applied to CBRA rather than CFRA. Aspects of RACH isolation may observe it is important that slice specific RACH shall not prevent access of Rel-15/Rel-16 legacy UEs. In addition, Rel-17 UEs supporting RACH isolation should not switch to another BWP to trigger common RACH when non-urgent slice traffic arrival. It is observed that following Rel-16 legacy mechanism, if two-step slice RACH resource configured in the BWP, high priority slice may trigger two-step RACH to reduce latency. The described techniques propose RAN2 to confirm for a slice or slice group, separated RO and/or preamble can be configured without overlapping with the existing RACH-ConfigCommon and RACH-ConfigCommonTwoStepRA.

Aspects of the described techniques may propose to support legacy UE and non-urgent slice, if slice specific RACH resource is configured in one BWP, common RACH resource may be configured in the same BWP. Aspects of the described techniques may propose to keep the below principle of Rel-16 RACH type selection and fallback mechanism for slice specific RACH: (1) if two-step RACH resource is configured in one BWP, the UE shall perform two-step RACH; (2) if both two-step and four-step resource are configured in one BWP, the UE selects to perform two-step RACH or four-step RACH based on RSRP threshold. Further study may determine whether to introduce a slice (group) specific RSRP.

The reuse access attempt number as condition to fallback from two-step RACH to four-step RACH may be considered. Further study may determine whether to introduce a slice (group) specific attempt number threshold. Aspects of the described techniques may propose RAN2 confirming the 5 cases in Table 1 above are supported for RACH type selection and fallback of slice specific RACH.

With respect to RACH prioritization, considering RAN2 is introducing RACH prioritization for different scenarios/cases ever from Rel-15 to Rel-17 (BFR/HO→MPS/MCS→Slice), specifying a flexible/configurable way is more forward compatible way. Accordingly, aspects of the described techniques propose scalingFactorBI and powerRampingStepHighPriority are baseline of slice specific prioritized RACH parameters. Other parameters can be considered if time allows. Aspects of the describes techniques propose for each RA prioritization parameters set (e.g. one set for MPS/MCS and another set for URLLC slice), a priority value can be configured by gNB or pre-configured via UE's subscription. And the UE's AS selects the set of RACH prioritization parameters with highest priority to perform RACH.

Figure 4:
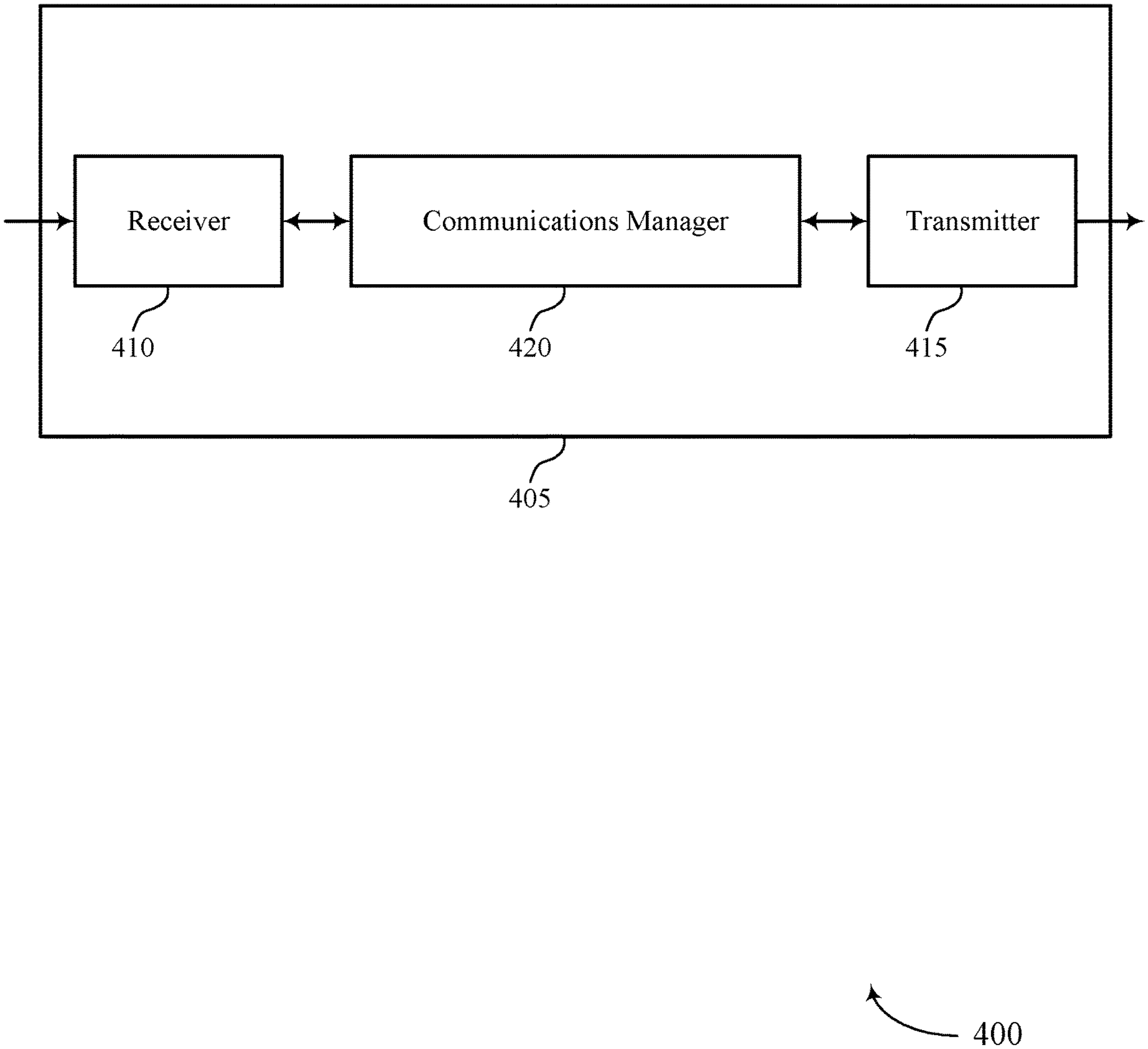
FIGS. 4 and 5 show block diagrams of devices that support RACH type selection and fallback mechanisms related to slicing in accordance with aspects of the present disclosure.

FIG. 4 shows a block diagram 400 of a device 405 that supports RACH type selection and fallback mechanisms related to slicing in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to RACH type selection and fallback mechanisms related to slicing). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to RACH type selection and fallback mechanisms related to slicing). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of RACH type selection and fallback mechanisms related to slicing as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving an indication of a configuration for a set of RACH procedure types for a bandwidth part of the UE, each RACH procedure type in the set of RACH procedure types being different from other RACH procedure types in the set of RACH procedure types. The communications manager 420 may be configured as or otherwise support a means for selecting a RACH procedure type from the set of RACH procedure types for the RACH procedure based on the indication of the configuration for the set of RACH procedure types and on a trigger to perform a RACH procedure for a network slice. The communications manager 420 may be configured as or otherwise support a means for performing the RACH procedure for the network slice according to the RACH procedure type.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improved RACH procedure type selection for a network slice (e.g., a slice-aware RACH procedure type).

Figure 5:
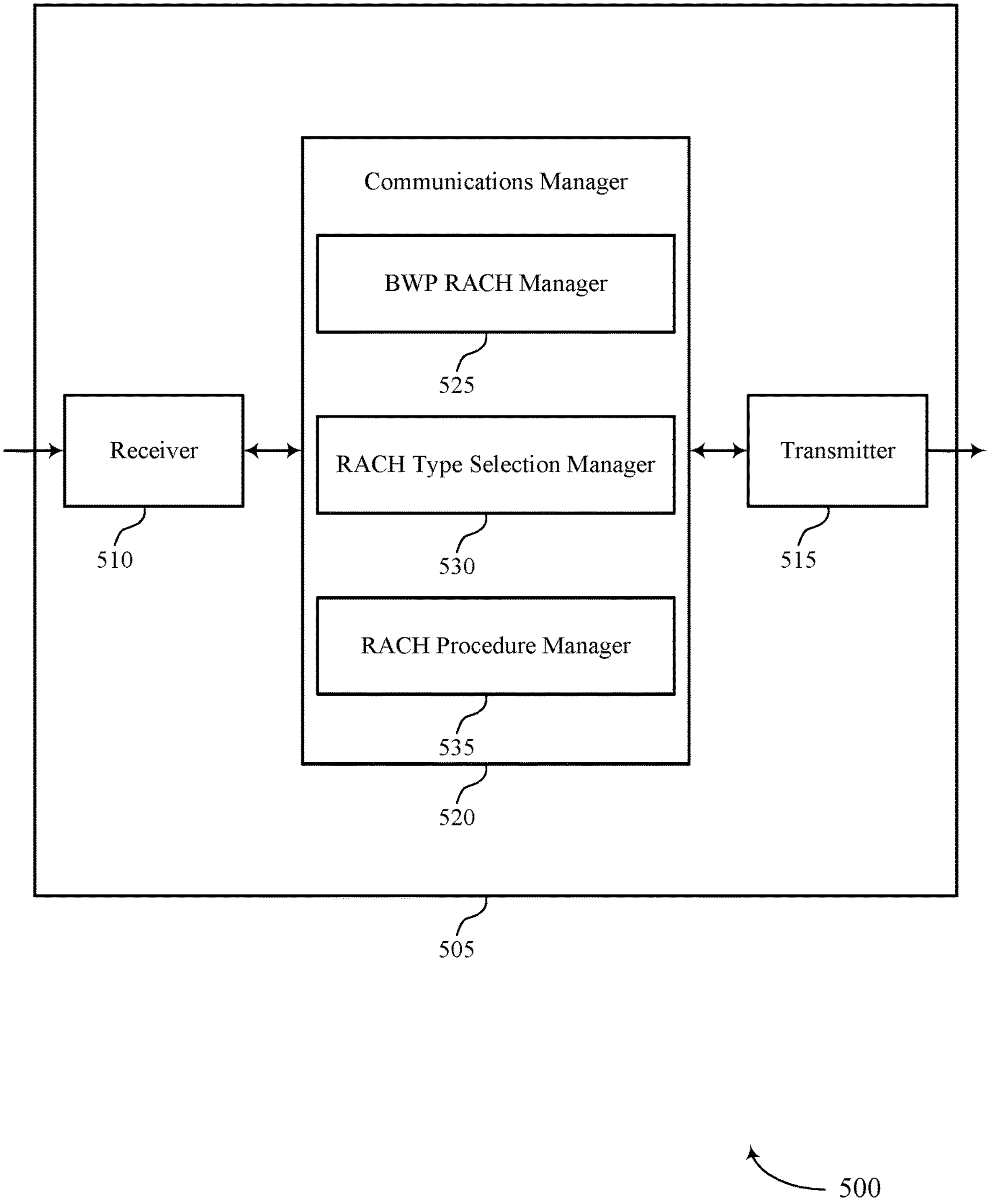

FIG. 5 shows a block diagram 500 of a device 505 that supports RACH type selection and fallback mechanisms related to slicing in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to RACH type selection and fallback mechanisms related to slicing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to RACH type selection and fallback mechanisms related to slicing). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of RACH type selection and fallback mechanisms related to slicing as described herein. For example, the communications manager 520 may include a BWP RACH manager 525, a RACH type selection manager 530, a RACH procedure manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The BWP RACH manager 525 may be configured as or otherwise support a means for receiving an indication of a configuration for a set of RACH procedure types for a bandwidth part of the UE, each RACH procedure type in the set of RACH procedure types being different from other RACH procedure types in the set of RACH procedure types. The RACH type selection manager 530 may be configured as or otherwise support a means for selecting a RACH procedure type from the set of RACH procedure types for the RACH procedure based on the indication of the configuration for the set of RACH procedure types and on a trigger to perform a RACH procedure for a network slice. The RACH procedure manager 535 may be configured as or otherwise support a means for performing the RACH procedure for the network slice according to the RACH procedure type.

Figure 6:
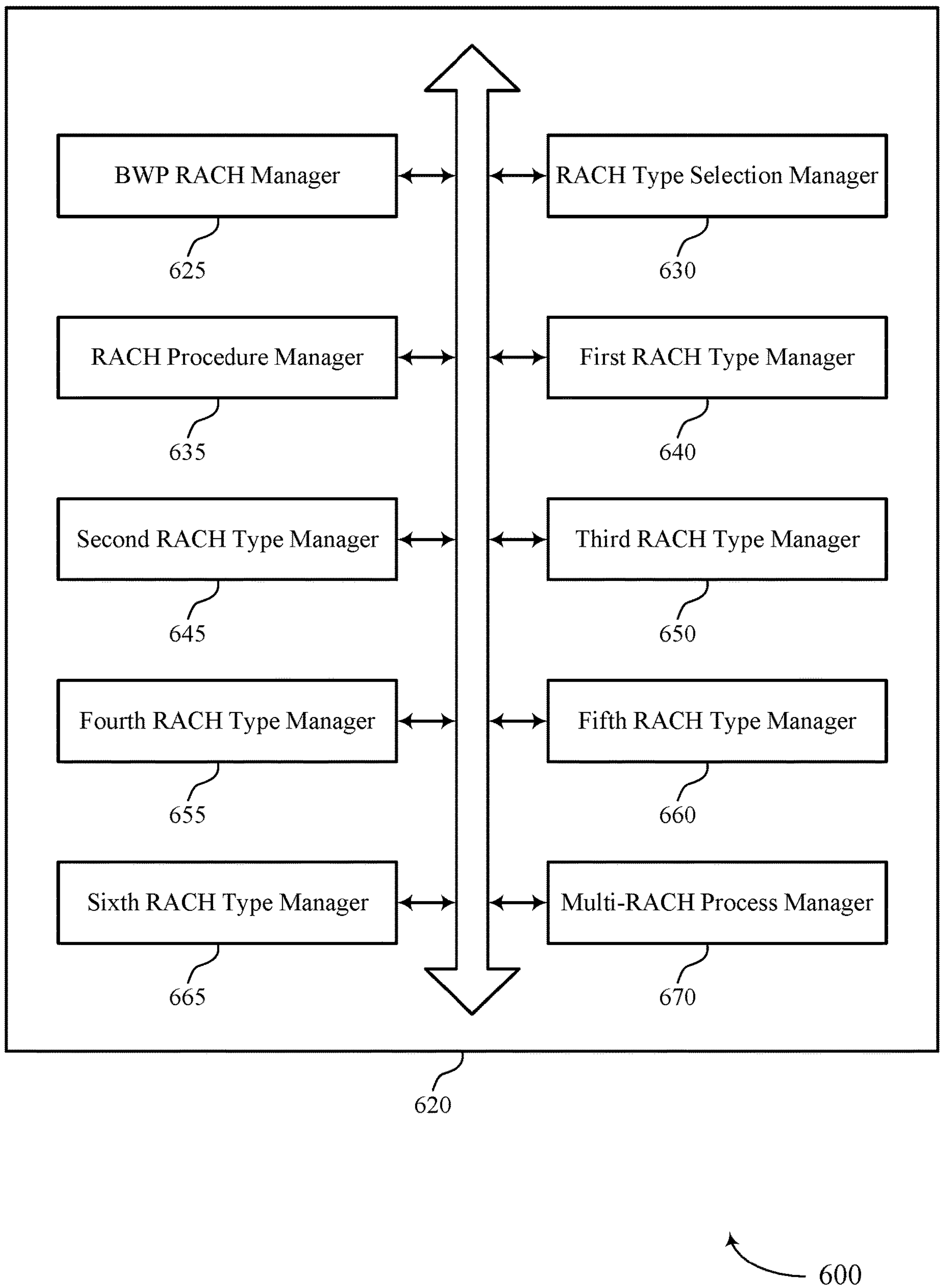
FIG. 6 shows a block diagram of a communications manager that supports RACH type selection and fallback mechanisms related to slicing in accordance with aspects of the present disclosure.

FIG. 6 shows a block diagram 600 of a communications manager 620 that supports RACH type selection and fallback mechanisms related to slicing in accordance with aspects of the present disclosure. The communications manager 620 may be an example of aspects of a communications manager 420, a communications manager 520, or both, as described herein. The communications manager 620, or various components thereof, may be an example of means for performing various aspects of RACH type selection and fallback mechanisms related to slicing as described herein. For example, the communications manager 620 may include a BWP RACH manager 625, a RACH type selection manager 630, a RACH procedure manager 635, a first RACH type manager 640, a second RACH type manager 645, a third RACH type manager 650, a fourth RACH type manager 655, a fifth RACH type manager 660, a sixth RACH type manager 665, a multi-RACH process manager 670, or any combination thereof. Each of these components may communicate, directly or indirectly, with one another (e.g., via one or more buses).

The communications manager 620 may support wireless communication at a UE in accordance with examples as disclosed herein. The BWP RACH manager 625 may be configured as or otherwise support a means for receiving an indication of a configuration for a set of RACH procedure types for a bandwidth part of the UE, each RACH procedure type in the set of RACH procedure types being different from other RACH procedure types in the set of RACH procedure types. The RACH type selection manager 630 may be configured as or otherwise support a means for selecting a RACH procedure type from the set of RACH procedure types for the RACH procedure based on the indication of the configuration for the set of RACH procedure types and on a trigger to perform a RACH procedure for a network slice. The RACH procedure manager 635 may be configured as or otherwise support a means for performing the RACH procedure for the network slice according to the RACH procedure type.

In some examples, the first RACH type manager 640 may be configured as or otherwise support a means for determining that the set of RACH procedure types includes a two-step contention free RACH procedure type, a two-step slice-based RACH procedure type, and a two-step common RACH procedure type, where selecting the RACH procedure type includes. In some examples, the first RACH type manager 640 may be configured as or otherwise support a means for selecting the two-step contention free RACH procedure type for the RACH procedure based on a receive power level of a synchronization signal satisfying a threshold receive power level and the network slice.

In some examples, the first RACH type manager 640 may be configured as or otherwise support a means for determining that the receive power level of the synchronization signal fails to satisfy the threshold receive power level, where selecting the RACH procedure type includes. In some examples, the first RACH type manager 640 may be configured as or otherwise support a means for selecting the two-step slice-based RACH procedure type based on the receive power level failing to satisfy the threshold receive power level.

In some examples, the first RACH type manager 640 may be configured as or otherwise support a means for determining that the RACH procedure was unsuccessful after a threshold number of attempts, the threshold number of attempts based on the trigger. In some examples, the first RACH type manager 640 may be configured as or otherwise support a means for performing a fallback RACH procedure using a four-step RACH procedure type of the set of RACH procedure types based on the unsuccessful RACH procedure.

In some examples, the second RACH type manager 645 may be configured as or otherwise support a means for determining that the set of RACH procedure types includes a four-step contention free RACH procedure type, a four-step slice-based RACH procedure type, and a four-step common RACH procedure type, where selecting the RACH procedure type includes. In some examples, the second RACH type manager 645 may be configured as or otherwise support a means for selecting the four-step contention free RACH procedure type for the RACH procedure based on a receive power level of a synchronization signal satisfying a threshold receive power level and the network slice.

In some examples, the second RACH type manager 645 may be configured as or otherwise support a means for determining that the receive power level of the synchronization signal fails to satisfy the threshold receive power level, where selecting the RACH procedure type includes. In some examples, the second RACH type manager 645 may be configured as or otherwise support a means for selecting the four-step slice-based RACH procedure type based on the receive power level failing to satisfy the threshold receive power level.

In some examples, the third RACH type manager 650 may be configured as or otherwise support a means for determining that the set of RACH procedure types includes a two-step slice-based RACH procedure type and a four-step common RACH procedure type, where selecting the RACH procedure type includes. In some examples, the third RACH type manager 650 may be configured as or otherwise support a means for selecting the two-step slice-based RACH procedure type for the RACH procedure based on the network slice.

In some examples, the third RACH type manager 650 may be configured as or otherwise support a means for determining that the RACH procedure was unsuccessful after a threshold number of attempts, the threshold number of attempts based on the trigger. In some examples, the third RACH type manager 650 may be configured as or otherwise support a means for performing a fallback RACH procedure using the four-step common RACH procedure type based on the unsuccessful RACH procedure.

In some examples, the fourth RACH type manager 655 may be configured as or otherwise support a means for determining that the set of RACH procedure types includes a two-step slice-based RACH procedure type, a four-step slice-based RACH procedure type, and a four-step common RACH procedure type, where selecting the RACH procedure type includes. In some examples, the fourth RACH type manager 655 may be configured as or otherwise support a means for selecting the two-step slice-based RACH procedure type for the RACH procedure based on a receive power level of a synchronization signal satisfying a threshold receive power level and the network slice.

In some examples, the fourth RACH type manager 655 may be configured as or otherwise support a means for determining that the receive power level of the synchronization signal fails to satisfy the threshold receive power level, where selecting the RACH procedure type includes. In some examples, the fourth RACH type manager 655 may be configured as or otherwise support a means for selecting the four-step slice-based RACH procedure type for the RACH procedure based on the receive power level failing to satisfy the threshold receive power level.

In some examples, the fourth RACH type manager 655 may be configured as or otherwise support a means for determining that the RACH procedure was unsuccessful after a threshold number of attempts, the threshold number of attempts based on the trigger. In some examples, the fourth RACH type manager 655 may be configured as or otherwise support a means for performing a fallback RACH procedure using the four-step slice-based RACH procedure type based on the unsuccessful RACH procedure.

In some examples, the fifth RACH type manager 660 may be configured as or otherwise support a means for determining that the set of RACH procedure types includes a four-step slice-based RACH procedure type and a two-step or four-step common RACH procedure type, where selecting the RACH procedure type includes. In some examples, the fifth RACH type manager 660 may be configured as or otherwise support a means for selecting the four-step slice-based RACH procedure type for the RACH procedure based on the network slice. In some examples, the fifth RACH type manager 660 may be configured as or otherwise support a means for refraining from performing a fallback RACH procedure using the two-step or four-step common RACH procedure type.

In some examples, the sixth RACH type manager 665 may be configured as or otherwise support a means for determining that the set of RACH procedure types includes a two-step slice-based RACH procedure type, a two-step common RACH procedure type, a four-step slice-based RACH procedure type, and a four-step common RACH procedure type, where selecting the RACH procedure type includes. In some examples, the sixth RACH type manager 665 may be configured as or otherwise support a means for selecting the two-step slice-based RACH procedure type for the RACH procedure based on a receive power level of a synchronization signal satisfying a threshold receive power level and the network slice.

In some examples, the sixth RACH type manager 665 may be configured as or otherwise support a means for determining that the receive power level of the synchronization signal fails to satisfy the threshold receive power level, where selecting the RACH procedure type includes. In some examples, the sixth RACH type manager 665 may be configured as or otherwise support a means for selecting the four-step slice-based RACH procedure type for the RACH procedure based on the receive power level failing to satisfy the threshold receive power level.

In some examples, the sixth RACH type manager 665 may be configured as or otherwise support a means for determining that the RACH procedure was unsuccessful after a threshold number of attempts, the threshold number of attempts based on the trigger. In some examples, the sixth RACH type manager 665 may be configured as or otherwise support a means for performing a fallback RACH procedure using the four-step slice-based RACH procedure type based on the unsuccessful RACH procedure.

In some examples, the multi-RACH process manager 670 may be configured as or otherwise support a means for determining that a second RACH procedure is being performed separate from the RACH procedure to be performed for the network slice, the second RACH procedure associated with a priority level. In some examples, the multi-RACH process manager 670 may be configured as or otherwise support a means for canceling the second RACH procedure to perform the RACH procedure type for the network slice based on the network slice being associated with a higher priority level than the priority level of the second RACH procedure.

In some examples, a resource of each RACH procedure type is non-overlapping with resources of other RACH procedure types in the set of RACH procedure types. In some examples, the network slice includes a network slice assistance information, a single network slice selection assistance information, a slice type, a service type, a set of single network slice selection assistance information, or any combination thereof. In some examples, an uplink data associated with the network slice is identified by the UE while the UE is operating in a radio resource control idle state or an RRC inactive state.

In some examples, an uplink data associated with the network slice is identified by the UE while the UE is operating in a radio resource control connected state and the UE is not configured with a physical uplink control channel resource to transmit a scheduling request. In some examples, an uplink data associated with the network slice is identified by the UE while the UE is operating in a radio resource control connected state and the UE is not uplink synchronized.

Figure 7:
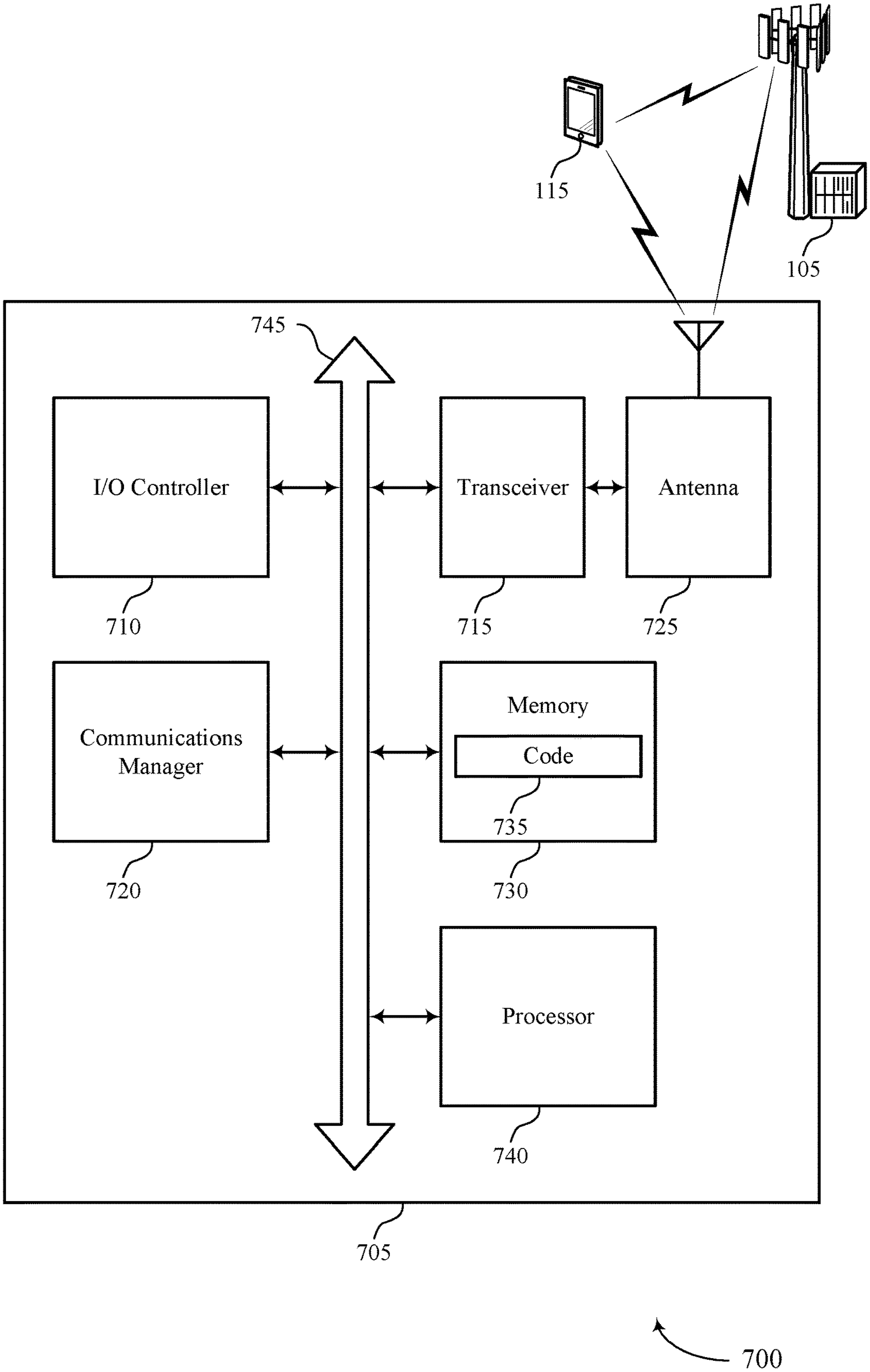
FIG. 7 shows a diagram of a system including a device that supports RACH type selection and fallback mechanisms related to slicing in accordance with aspects of the present disclosure.

FIG. 7 shows a diagram of a system 700 including a device 705 that supports RACH type selection and fallback mechanisms related to slicing in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting RACH type selection and fallback mechanisms related to slicing). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving an indication of a configuration for a set of RACH procedure types for a bandwidth part of the UE, each RACH procedure type in the set of RACH procedure types being different from other RACH procedure types in the set of RACH procedure types. The communications manager 720 may be configured as or otherwise support a means for selecting a RACH procedure type from the set of RACH procedure types for the RACH procedure based on the indication of the configuration for the set of RACH procedure types and on a trigger to perform a RACH procedure for a network slice. The communications manager 720 may be configured as or otherwise support a means for performing the RACH procedure for the network slice according to the RACH procedure type.

By including or configuring the communications manager 720 in accordance with examples as described herein, the device 705 may support techniques for improved RACH procedure type selection for a network slice (e.g., a slice-aware RACH procedure type).

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of RACH type selection and fallback mechanisms related to slicing as described herein, or the processor 740 and the memory 730 may be otherwise configured to perform or support such operations.

Figure 8:
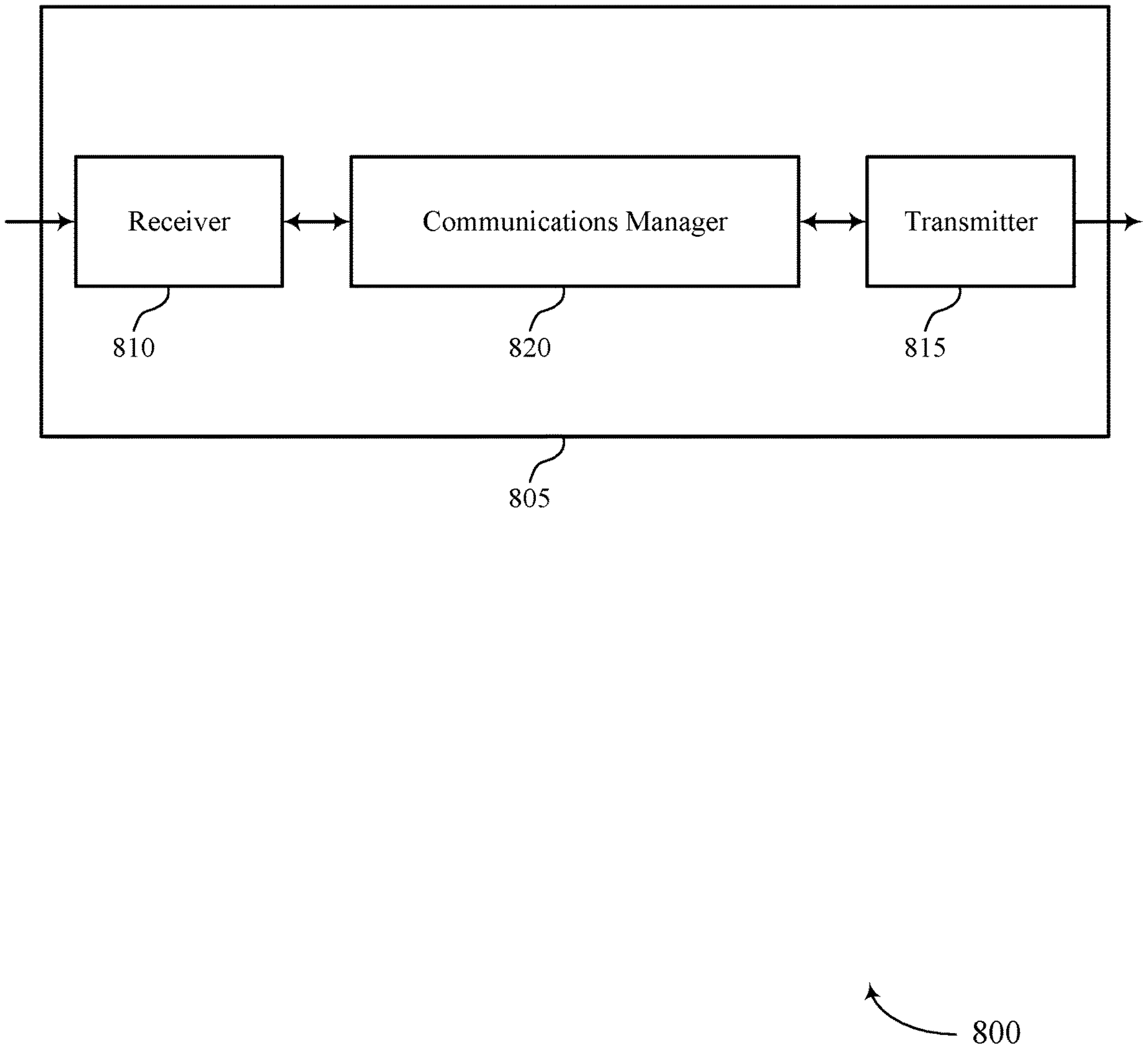
FIGS. 8 and 9 show block diagrams of devices that support RACH type selection and fallback mechanisms related to slicing in accordance with aspects of the present disclosure.

FIG. 8 shows a block diagram 800 of a device 805 that supports RACH type selection and fallback mechanisms related to slicing in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to RACH type selection and fallback mechanisms related to slicing). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to RACH type selection and fallback mechanisms related to slicing). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of RACH type selection and fallback mechanisms related to slicing as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, an indication of a configuration for a set of RACH procedure types for a bandwidth part of the UE, each RACH procedure type in the set of RACH procedure types being different from other RACH procedure types in the set of RACH procedure types. The communications manager 820 may be configured as or otherwise support a means for transmitting, to the UE, a trigger to perform a RACH procedure type for a network slice. The communications manager 820 may be configured as or otherwise support a means for performing the RACH procedure for the network slice according to a RACH procedure type selected by the UE from the set of RACH procedure types based on the indication of the configuration for the set of RACH procedure types and on the trigger.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improved RACH procedure type selection for a network slice (e.g., a slice-aware RACH procedure type).

Figure 9:
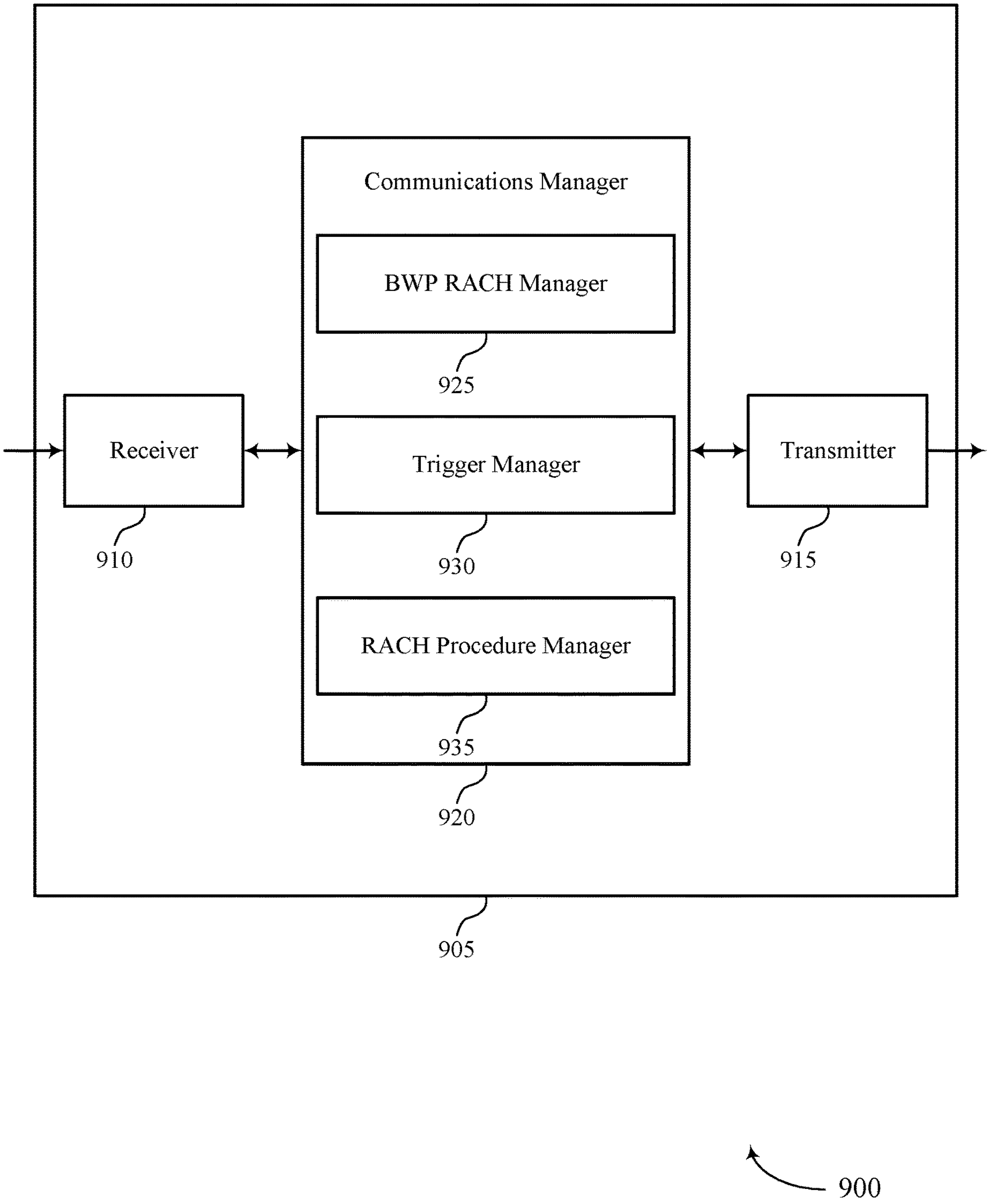

FIG. 9 shows a block diagram 900 of a device 905 that supports RACH type selection and fallback mechanisms related to slicing in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to RACH type selection and fallback mechanisms related to slicing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to RACH type selection and fallback mechanisms related to slicing). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of RACH type selection and fallback mechanisms related to slicing as described herein. For example, the communications manager 920 may include a BWP RACH manager 925, a trigger manager 930, a RACH procedure manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The BWP RACH manager 925 may be configured as or otherwise support a means for transmitting, to a UE, an indication of a configuration for a set of RACH procedure types for a bandwidth part of the UE, each RACH procedure type in the set of RACH procedure types being different from other RACH procedure types in the set of RACH procedure types. The trigger manager 930 may be configured as or otherwise support a means for transmitting, to the UE, a trigger to perform a RACH procedure type for a network slice. The RACH procedure manager 935 may be configured as or otherwise support a means for performing the RACH procedure for the network slice according to a RACH procedure type selected by the UE from the set of RACH procedure types based on the indication of the configuration for the set of RACH procedure types and on the trigger.

Figure 10:
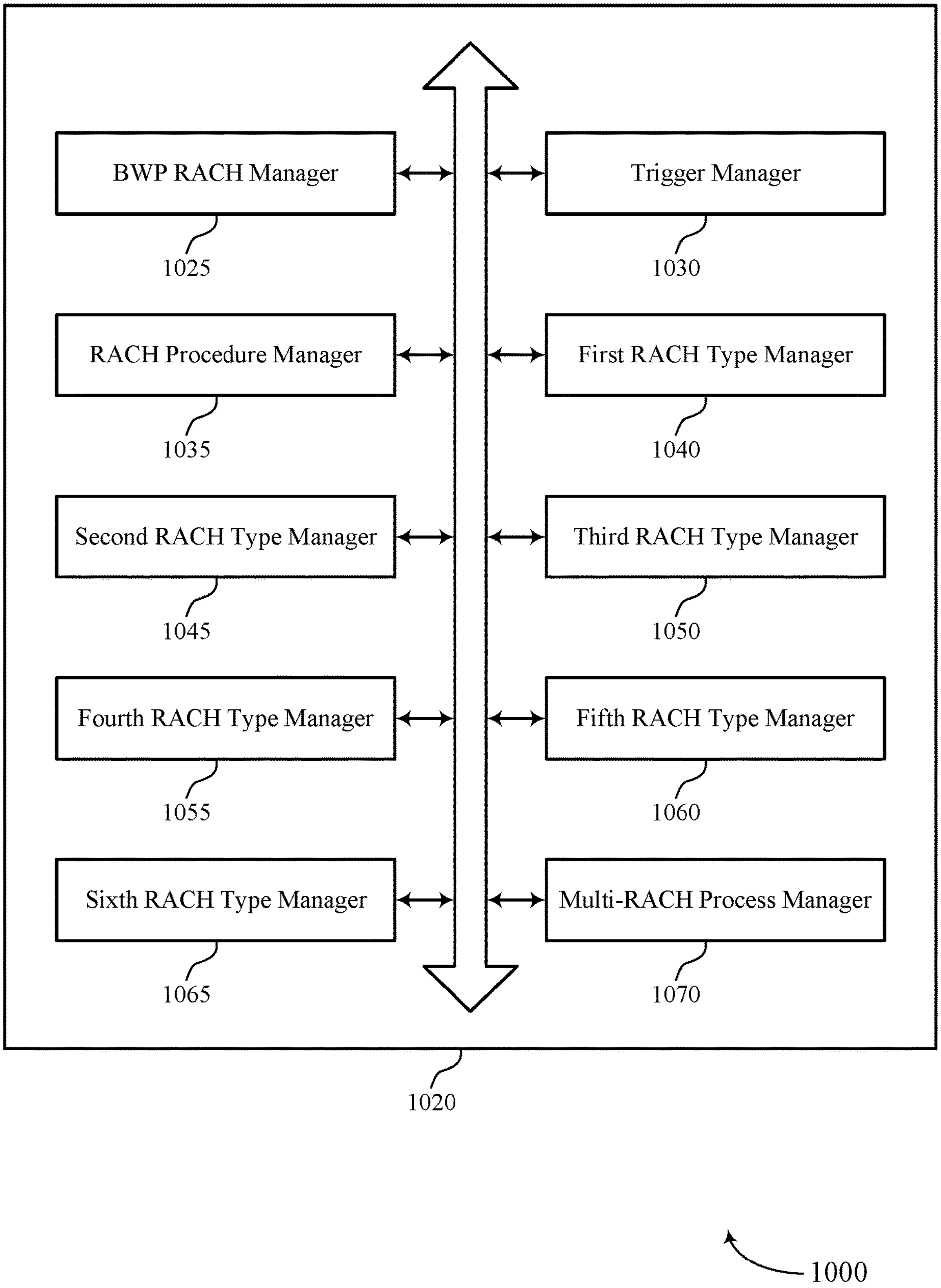
FIG. 10 shows a block diagram of a communications manager that supports RACH type selection and fallback mechanisms related to slicing in accordance with aspects of the present disclosure.

FIG. 10 shows a block diagram 1000 of a communications manager 1020 that supports RACH type selection and fallback mechanisms related to slicing in accordance with aspects of the present disclosure. The communications manager 1020 may be an example of aspects of a communications manager 820, a communications manager 920, or both, as described herein. The communications manager 1020, or various components thereof, may be an example of means for performing various aspects of RACH type selection and fallback mechanisms related to slicing as described herein. For example, the communications manager 1020 may include a BWP RACH manager 1025, a trigger manager 1030, a RACH procedure manager 1035, a first RACH type manager 1040, a second RACH type manager 1045, a third RACH type manager 1050, a fourth RACH type manager 1055, a fifth RACH type manager 1060, a sixth RACH type manager 1065, a multi-RACH process manager 1070, or any combination thereof. Each of these components may communicate, directly or indirectly, with one another (e.g., via one or more buses).

The communications manager 1020 may support wireless communication at a base station in accordance with examples as disclosed herein. The BWP RACH manager 1025 may be configured as or otherwise support a means for transmitting, to a UE, an indication of a configuration for a set of RACH procedure types for a bandwidth part of the UE, each RACH procedure type in the set of RACH procedure types being different from other RACH procedure types in the set of RACH procedure types. The trigger manager 1030 may be configured as or otherwise support a means for transmitting, to the UE, a trigger to perform a RACH procedure type for a network slice. The RACH procedure manager 1035 may be configured as or otherwise support a means for performing the RACH procedure for the network slice according to a RACH procedure type selected by the UE from the set of RACH procedure types based on the indication of the configuration for the set of RACH procedure types and on the trigger.

In some examples, to support performing the RACH procedure, the first RACH type manager 1040 may be configured as or otherwise support a means for performing the RACH procedure using the two-step contention free RACH procedure type based on the UE determining that a receive power level of a synchronization signal satisfies a threshold receive power level and the network slice.

In some examples, to support performing the RACH procedure, the first RACH type manager 1040 may be configured as or otherwise support a means for performing the RACH procedure using the two-step slice-based RACH procedure type based on the UE determining that the receive power level fails to satisfy the threshold receive power level.

In some examples, the first RACH type manager 1040 may be configured as or otherwise support a means for performing a fallback RACH procedure using a four-step RACH procedure type of the set of RACH procedure types based on the UE determining that the RACH procedure was unsuccessful after a threshold number of attempts.

In some examples, to support performing the RACH procedure, the second RACH type manager 1045 may be configured as or otherwise support a means for performing the RACH procedure using the four-step contention free RACH procedure type based on the UE determining that a receive power level of a synchronization signal satisfies a threshold receive power level and the network slice.

In some examples, to support performing the RACH procedure, the second RACH type manager 1045 may be configured as or otherwise support a means for performing the RACH procedure using the four-step slice-based RACH procedure type based on the UE determining that the receive power level fails to satisfy the threshold receive power level.

In some examples, to support performing the RACH procedure, the third RACH type manager 1050 may be configured as or otherwise support a means for performing the RACH procedure using the two-step slice-based RACH procedure type based on the network slice. In some examples, the third RACH type manager 1050 may be configured as or otherwise support a means for performing a fallback RACH procedure using the four-step common RACH procedure type based on the UE determining that the RACH procedure was unsuccessful after a threshold number of attempts.

In some examples, to support performing the RACH procedure, the fourth RACH type manager 1055 may be configured as or otherwise support a means for performing the RACH procedure using the two-step slice-based RACH procedure type based on the UE determining that a receive power level of a synchronization signal satisfies a threshold receive power level and the network slice. In some examples, to support performing the RACH procedure, the fourth RACH type manager 1055 may be configured as or otherwise support a means for performing the RACH procedure using the four-step slice-based RACH procedure type based on the UE determining that the receive power level fails to satisfy the threshold receive power level.

In some examples, the fourth RACH type manager 1055 may be configured as or otherwise support a means for performing a fallback RACH procedure using the four-step slice-based RACH procedure type based on the UE determining that the RACH procedure was unsuccessful after a threshold number of attempts.

In some examples, to support performing the RACH procedure, the fifth RACH type manager 1060 may be configured as or otherwise support a means for performing the RACH procedure using the four-step slice-based RACH procedure type based on the network slice. In some examples, to support performing the RACH procedure, the fifth RACH type manager 1060 may be configured as or otherwise support a means for refraining from performing a fallback RACH procedure using the two-step or four-step common RACH procedure type.

In some examples, to support performing the RACH procedure, the sixth RACH type manager 1065 may be configured as or otherwise support a means for performing the RACH procedure using the two-step slice-based RACH procedure type based on the UE determining that a receive power level of a synchronization signal satisfies a threshold receive power level and the network slice. In some examples, determining that the receive power level of the synchronization signal fails to satisfy the threshold receive power level, where performing the RACH procedure includes. In some examples, performing the RACH procedure using the four-step slice-based RACH procedure type based on the UE determining that the receive power level fails to satisfy the threshold receive power level.

In some examples, the sixth RACH type manager 1065 may be configured as or otherwise support a means for performing a fallback RACH procedure using the four-step slice-based RACH procedure type based on the UE determining that the RACH procedure was unsuccessful after a threshold number of attempts.

In some examples, the multi-RACH process manager 1070 may be configured as or otherwise support a means for determining that a second RACH procedure is being performed with the UE separate from the RACH procedure to be performed for the network slice, the second RACH procedure associated with a priority level. In some examples, the multi-RACH process manager 1070 may be configured as or otherwise support a means for canceling the second RACH procedure to perform the RACH procedure for the network slice based on the network slice being associated with a higher priority level than the priority level of the second RACH procedure.

In some examples, a resource of each RACH procedure type is non-overlapping with resources of other RACH procedure types in the set of RACH procedure types. In some examples, the network slice includes a network slice assistance information, a single network slice selection assistance information, a slice type, a service type, a set of single network slice selection assistance information, or any combination thereof.

Figure 11:
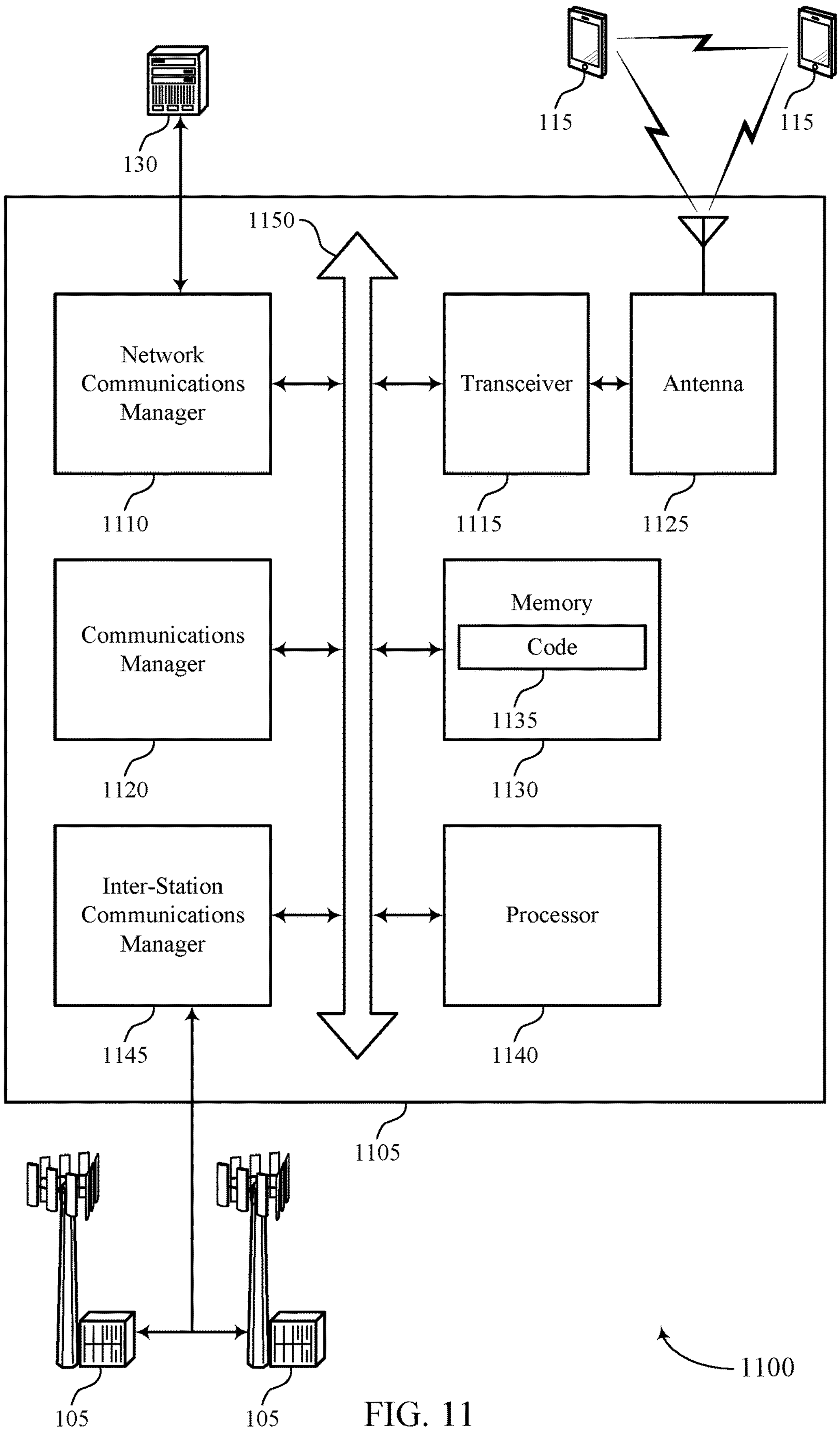
FIG. 11 shows a diagram of a system including a device that supports RACH type selection and fallback mechanisms related to slicing in accordance with aspects of the present disclosure.

FIG. 11 shows a diagram of a system 1100 including a device 1105 that supports RACH type selection and fallback mechanisms related to slicing in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting RACH type selection and fallback mechanisms related to slicing). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, an indication of a configuration for a set of RACH procedure types for a bandwidth part of the UE, each RACH procedure type in the set of RACH procedure types being different from other RACH procedure types in the set of RACH procedure types. The communications manager 1120 may be configured as or otherwise support a means for transmitting, to the UE, a trigger to perform a RACH procedure type for a network slice. The communications manager 1120 may be configured as or otherwise support a means for performing the RACH procedure for the network slice according to a RACH procedure type selected by the UE from the set of RACH procedure types based on the indication of the configuration for the set of RACH procedure types and on the trigger.

By including or configuring the communications manager 1120 in accordance with examples as described herein, the device 1105 may support techniques for improved RACH procedure type selection for a network slice (e.g., a slice-aware RACH procedure type).

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of RACH type selection and fallback mechanisms related to slicing as described herein, or the processor 1140 and the memory 1130 may be otherwise configured to perform or support such operations.

Figure 12:
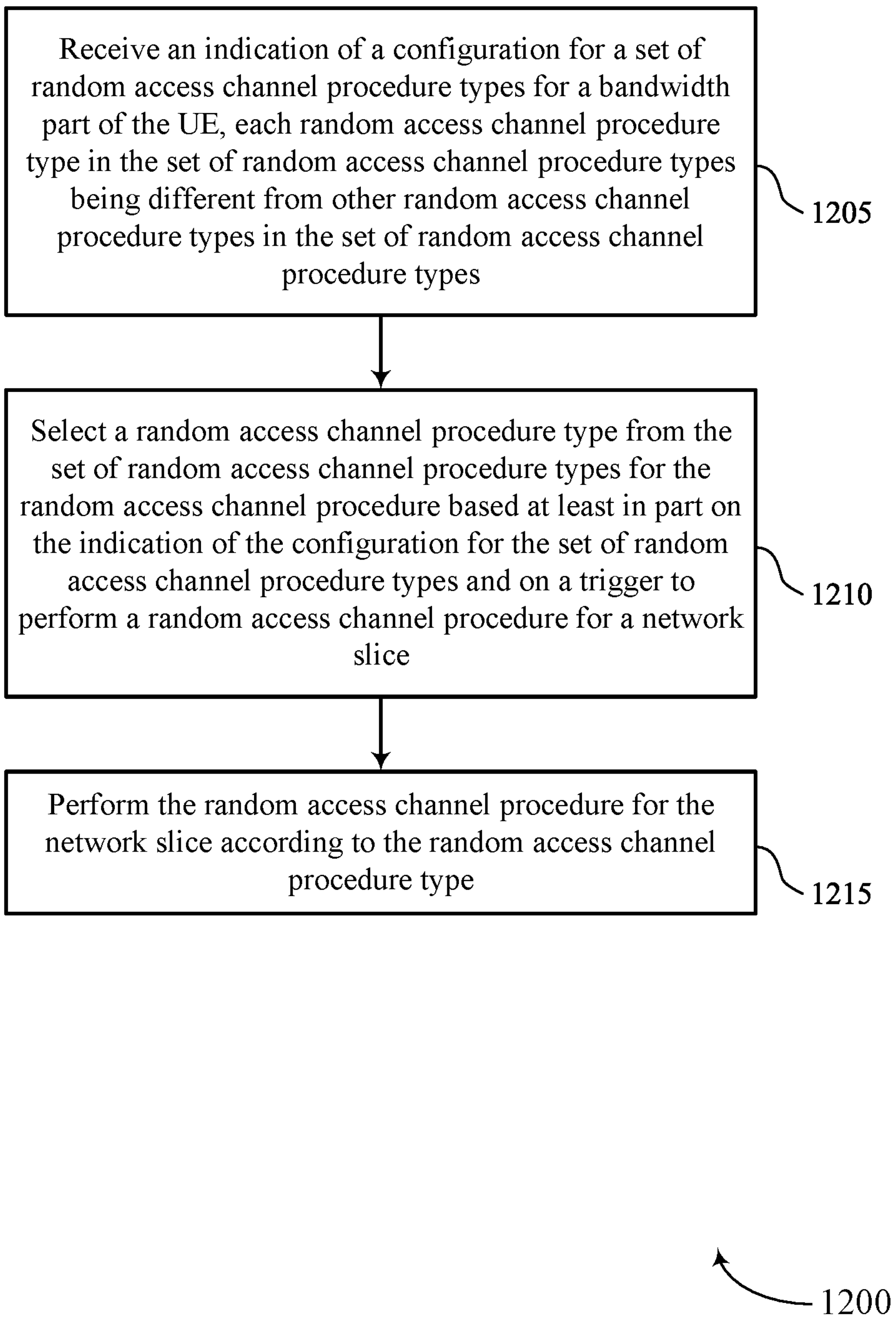
FIGS. 12 through 16 show flowcharts illustrating methods that support RACH type selection and fallback mechanisms related to slicing in accordance with aspects of the present disclosure.

FIG. 12 shows a flowchart illustrating a method 1200 that supports RACH type selection and fallback mechanisms related to slicing in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving an indication of a configuration for a set of RACH procedure types for a bandwidth part of the UE, each RACH procedure type in the set of RACH procedure types being different from other RACH procedure types in the set of RACH procedure types. The operations of 1205 may be performed in accordance with examples as disclosed herein. In some examples, aspects of the operations of 1205 may be performed by a BWP RACH manager 625 as described with reference to FIG. 6.

At 1210, the method may include selecting a RACH procedure type from the set of RACH procedure types for the RACH procedure based on the indication of the configuration for the set of RACH procedure types and on a trigger to perform a RACH procedure for a network slice. The operations of 1210 may be performed in accordance with examples as disclosed herein. In some examples, aspects of the operations of 1210 may be performed by a RACH type selection manager 630 as described with reference to FIG. 6.

At 1215, the method may include performing the RACH procedure for the network slice according to the RACH procedure type. The operations of 1215 may be performed in accordance with examples as disclosed herein. In some examples, aspects of the operations of 1215 may be performed by a RACH procedure manager 635 as described with reference to FIG. 6.

Figure 13:
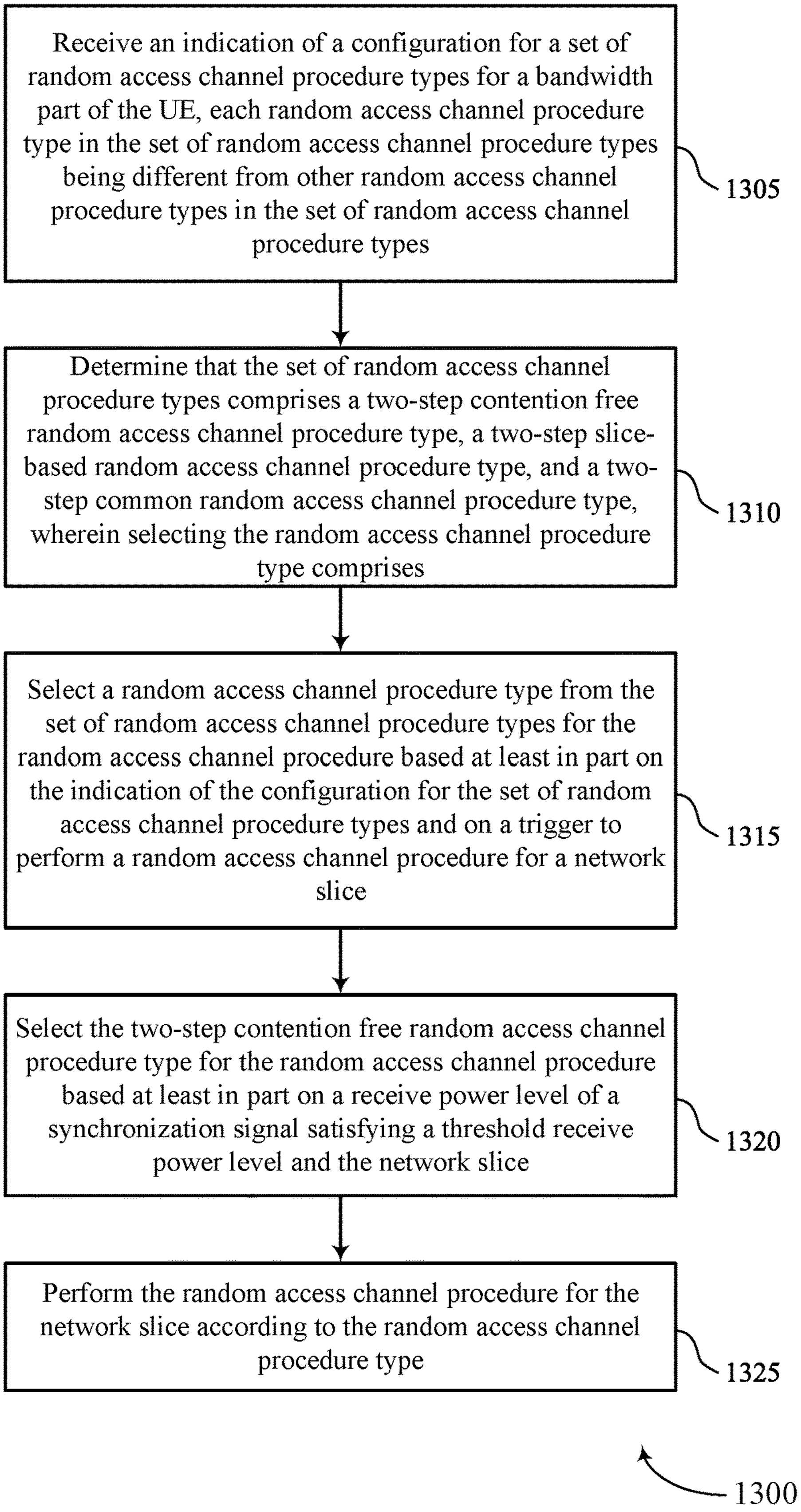

FIG. 13 shows a flowchart illustrating a method 1300 that supports RACH type selection and fallback mechanisms related to slicing in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving an indication of a configuration for a set of RACH procedure types for a bandwidth part of the UE, each RACH procedure type in the set of RACH procedure types being different from other RACH procedure types in the set of RACH procedure types.

The operations of 1305 may be performed in accordance with examples as disclosed herein. In some examples, aspects of the operations of 1305 may be performed by a BWP RACH manager 625 as described with reference to FIG. 6.

At 1310, the method may include determining that the set of RACH procedure types includes a two-step contention free RACH procedure type, a two-step slice-based RACH procedure type, and a two-step common RACH procedure type, where selecting the RACH procedure type includes. The operations of 1310 may be performed in accordance with examples as disclosed herein. In some examples, aspects of the operations of 1310 may be performed by a first RACH type manager 640 as described with reference to FIG. 6.

At 1315, the method may include selecting a RACH procedure type from the set of RACH procedure types for the RACH procedure based on the indication of the configuration for the set of RACH procedure types and on a trigger to perform a RACH procedure for a network slice. The operations of 1315 may be performed in accordance with examples as disclosed herein. In some examples, aspects of the operations of 1315 may be performed by a RACH type selection manager 630 as described with reference to FIG. 6.

At 1320, the method may include selecting the two-step contention free RACH procedure type for the RACH procedure based on a receive power level of a synchronization signal satisfying a threshold receive power level and the network slice. The operations of 1320 may be performed in accordance with examples as disclosed herein. In some examples, aspects of the operations of 1320 may be performed by a first RACH type manager 640 as described with reference to FIG. 6.

At 1325, the method may include performing the RACH procedure for the network slice according to the RACH procedure type. The operations of 1325 may be performed in accordance with examples as disclosed herein. In some examples, aspects of the operations of 1325 may be performed by a RACH procedure manager 635 as described with reference to FIG. 6.

Figure 14:
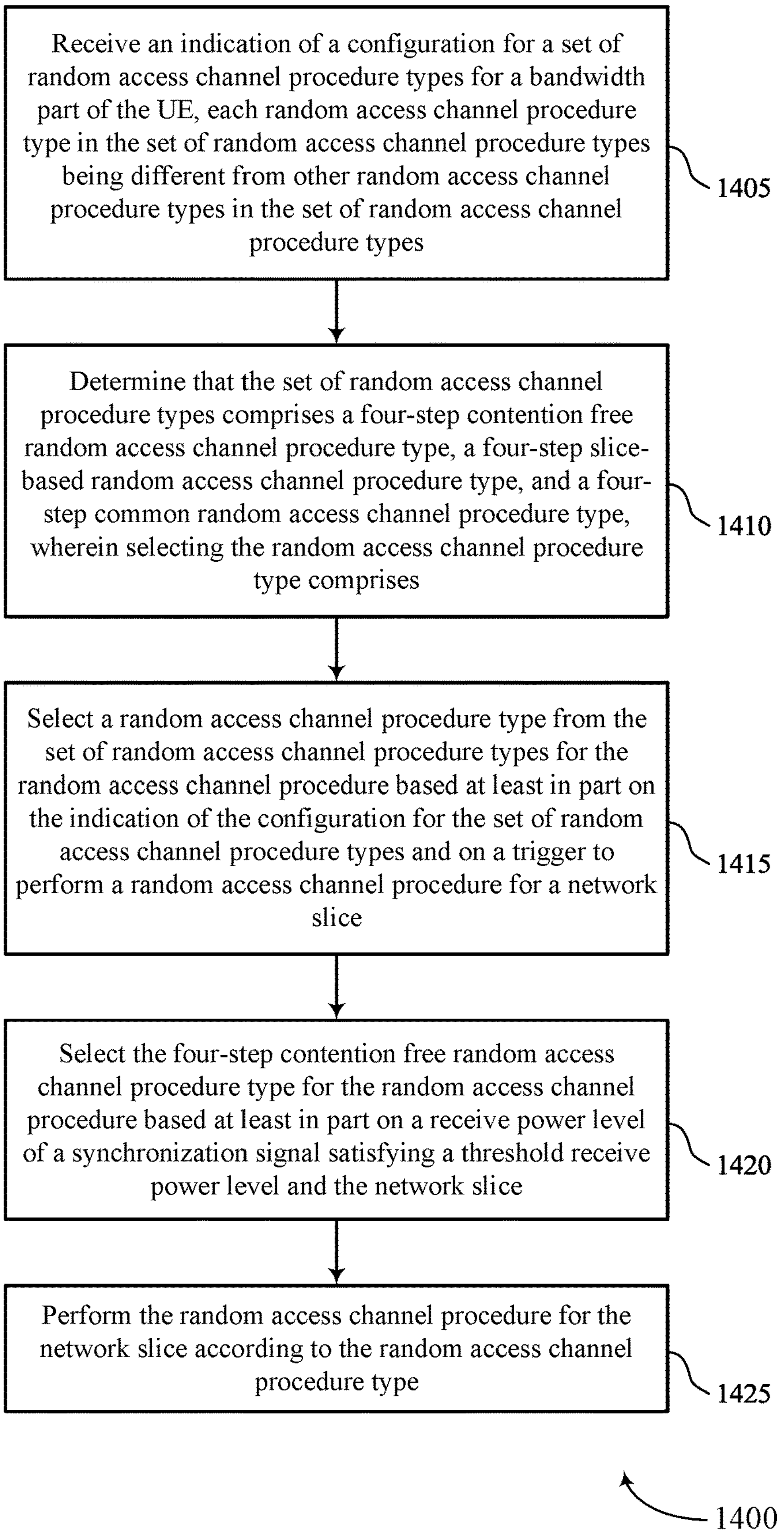

FIG. 14 shows a flowchart illustrating a method 1400 that supports RACH type selection and fallback mechanisms related to slicing in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving an indication of a configuration for a set of RACH procedure types for a bandwidth part of the UE, each RACH procedure type in the set of RACH procedure types being different from other RACH procedure types in the set of RACH procedure types. The operations of 1405 may be performed in accordance with examples as disclosed herein. In some examples, aspects of the operations of 1405 may be performed by a BWP RACH manager 625 as described with reference to FIG. 6.

At 1410, the method may include determining that the set of RACH procedure types includes a four-step contention free RACH procedure type, a four-step slice-based RACH procedure type, and a four-step common RACH procedure type, where selecting the RACH procedure type includes. The operations of 1410 may be performed in accordance with examples as disclosed herein. In some examples, aspects of the operations of 1410 may be performed by a second RACH type manager 645 as described with reference to FIG. 6.

At 1415, the method may include selecting a RACH procedure type from the set of RACH procedure types for the RACH procedure based on the indication of the configuration for the set of RACH procedure types and on a trigger to perform a RACH procedure for a network slice. The operations of 1415 may be performed in accordance with examples as disclosed herein. In some examples, aspects of the operations of 1415 may be performed by a RACH type selection manager 630 as described with reference to FIG. 6.

At 1420, the method may include selecting the four-step contention free RACH procedure type for the RACH procedure based on a receive power level of a synchronization signal satisfying a threshold receive power level and the network slice. The operations of 1420 may be performed in accordance with examples as disclosed herein. In some examples, aspects of the operations of 1420 may be performed by a second RACH type manager 645 as described with reference to FIG. 6.

At 1425, the method may include performing the RACH procedure for the network slice according to the RACH procedure type. The operations of 1425 may be performed in accordance with examples as disclosed herein. In some examples, aspects of the operations of 1425 may be performed by a RACH procedure manager 635 as described with reference to FIG. 6.

Figure 15:
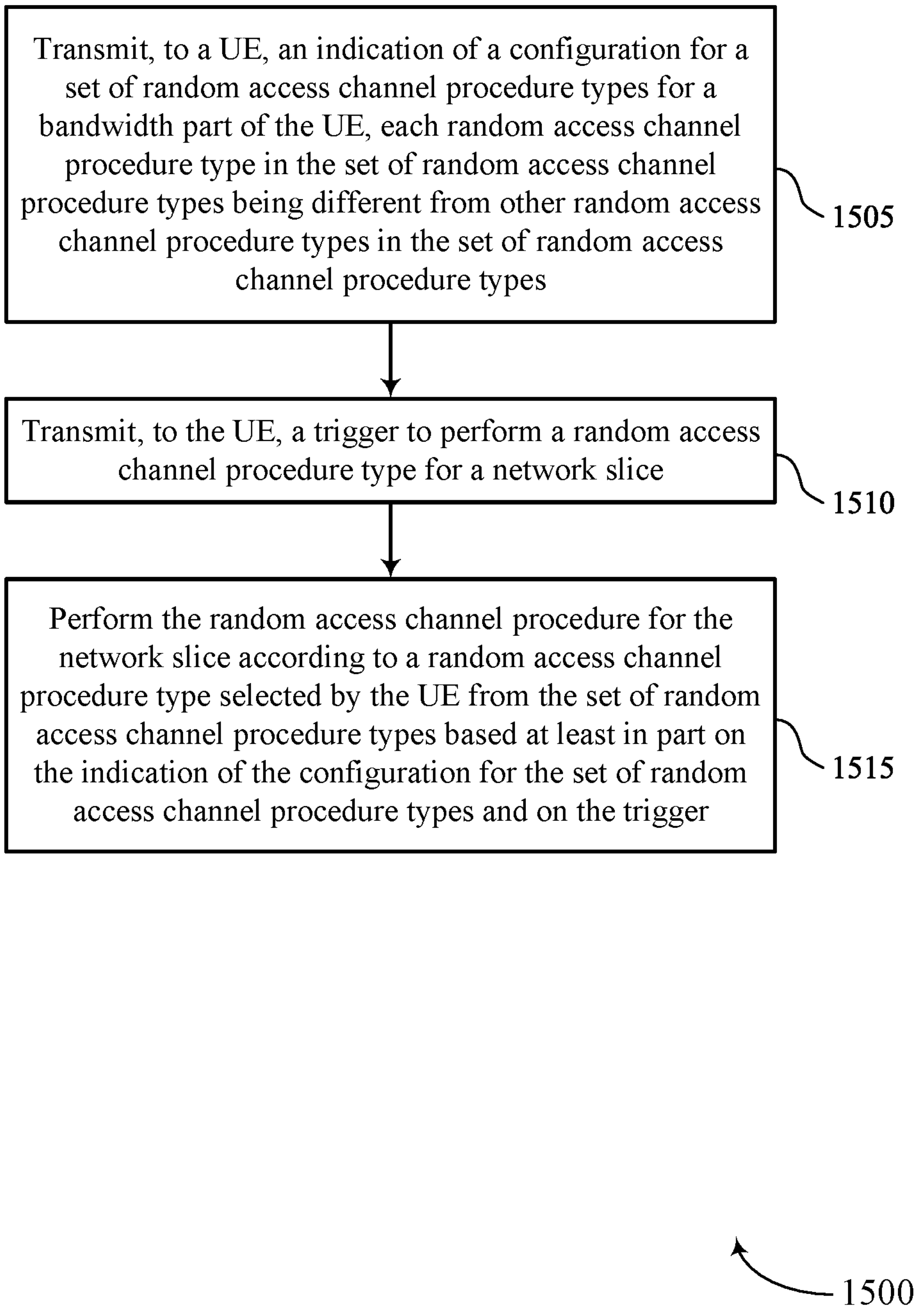

FIG. 15 shows a flowchart illustrating a method 1500 that supports RACH type selection and fallback mechanisms related to slicing in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, an indication of a configuration for a set of RACH procedure types for a bandwidth part of the UE, each RACH procedure type in the set of RACH procedure types being different from other RACH procedure types in the set of RACH procedure types. The operations of 1505 may be performed in accordance with examples as disclosed herein. In some examples, aspects of the operations of 1505 may be performed by a BWP RACH manager 1025 as described with reference to FIG. 10.

At 1510, the method may include transmitting, to the UE, a trigger to perform a RACH procedure type for a network slice. The operations of 1510 may be performed in accordance with examples as disclosed herein. In some examples, aspects of the operations of 1510 may be performed by a trigger manager 1030 as described with reference to FIG. 10.

At 1515, the method may include performing the RACH procedure for the network slice according to a RACH procedure type selected by the UE from the set of RACH procedure types based on the indication of the configuration for the set of RACH procedure types and on the trigger. The operations of 1515 may be performed in accordance with examples as disclosed herein. In some examples, aspects of the operations of 1515 may be performed by a RACH procedure manager 1035 as described with reference to FIG. 10.

Figure 16:
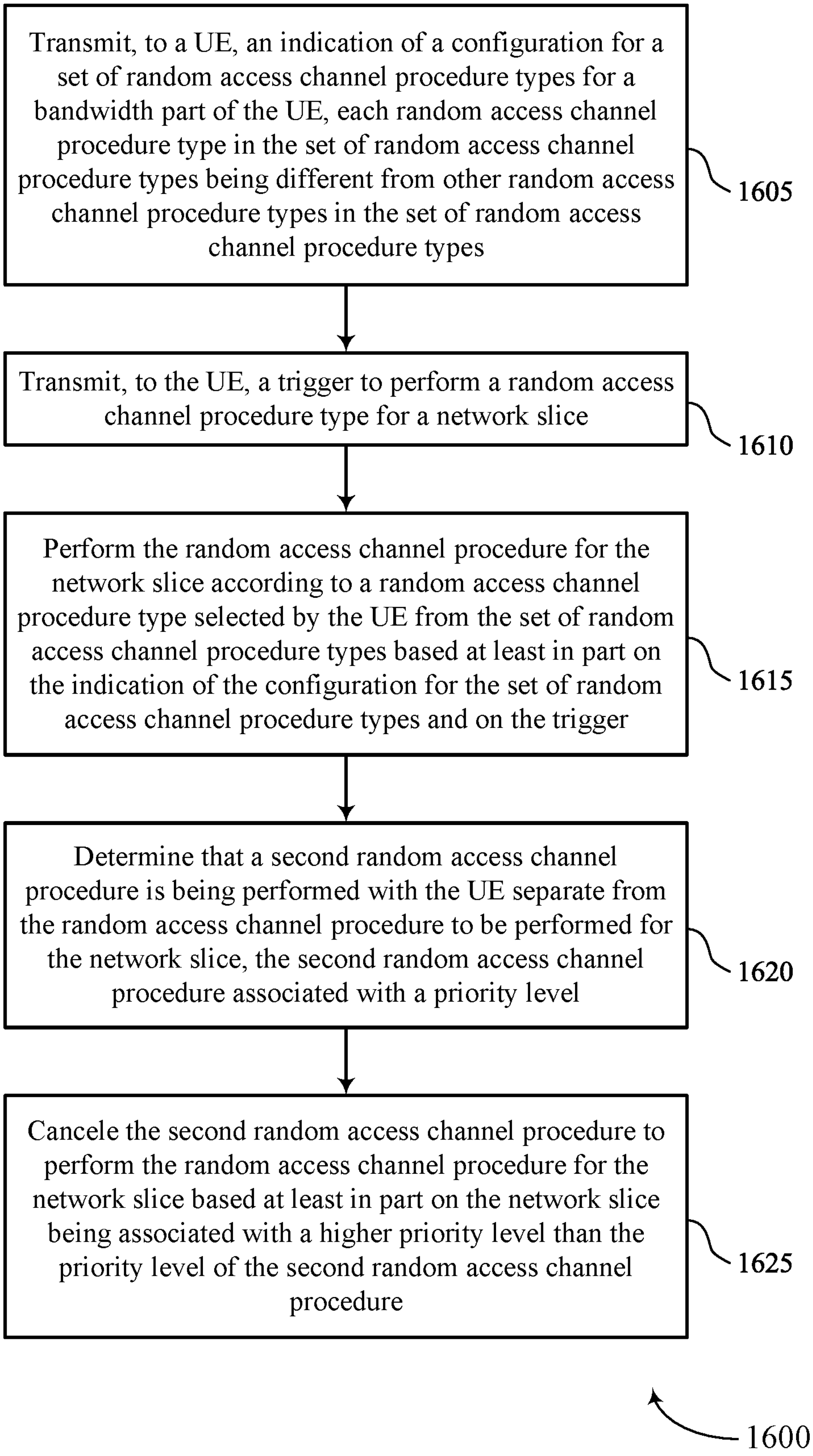

FIG. 16 shows a flowchart illustrating a method 1600 that supports RACH type selection and fallback mechanisms related to slicing in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, an indication of a configuration for a set of RACH procedure types for a bandwidth part of the UE, each RACH procedure type in the set of RACH procedure types being different from other RACH procedure types in the set of RACH procedure types. The operations of 1605 may be performed in accordance with examples as disclosed herein. In some examples, aspects of the operations of 1605 may be performed by a BWP RACH manager 1025 as described with reference to FIG. 10.

At 1610, the method may include transmitting, to the UE, a trigger to perform a RACH procedure type for a network slice. The operations of 1610 may be performed in accordance with examples as disclosed herein. In some examples, aspects of the operations of 1610 may be performed by a trigger manager 1030 as described with reference to FIG. 10.

At 1615, the method may include performing the RACH procedure for the network slice according to a RACH procedure type selected by the UE from the set of RACH procedure types based on the indication of the configuration for the set of RACH procedure types and on the trigger. The operations of 1615 may be performed in accordance with examples as disclosed herein. In some examples, aspects of the operations of 1615 may be performed by a RACH procedure manager 1035 as described with reference to FIG. 10.

At 1620, the method may include determining that a second RACH procedure is being performed with the UE separate from the RACH procedure to be performed for the network slice, the second RACH procedure associated with a priority level. The operations of 1620 may be performed in accordance with examples as disclosed herein. In some examples, aspects of the operations of 1620 may be performed by a multi-RACH process manager 1070 as described with reference to FIG. 10.

At 1625, the method may include canceling the second RACH procedure to perform the RACH procedure for the network slice based on the network slice being associated with a higher priority level than the priority level of the second RACH procedure. The operations of 1625 may be performed in accordance with examples as disclosed herein. In some examples, aspects of the operations of 1625 may be performed by a multi-RACH process manager 1070 as described with reference to FIG. 10.

The following provides an overview of aspects of the present disclosure:

Aspect 1: A method for wireless communication at a UE, comprising: receiving an indication of a configuration for a set of RACH procedure types for a BWP of the UE, each RACH procedure type in the set of RACH procedure types being different from other RACH procedure types in the set of RACH procedure types; selecting a RACH procedure type from the set of RACH procedure types for the RACH procedure based at least in part on the indication of the configuration for the set of RACH procedure types and on a trigger to perform a RACH procedure for a network slice; and performing the RACH procedure for the network slice according to the RACH procedure type.

Aspect 2: The method of aspect 1, further comprising: determining that the set of RACH procedure types comprises a two-step contention free RACH procedure type, a two-step slice-based RACH procedure type, and a two-step common RACH procedure type, wherein selecting the RACH procedure type comprises; and selecting the two-step contention free RACH procedure type for the RACH procedure based at least in part on a receive power level of a synchronization signal satisfying a threshold receive power level and the network slice.

Aspect 3: The method of aspect 2, further comprising: determining that the receive power level of the synchronization signal fails to satisfy the threshold receive power level, wherein selecting the RACH procedure type comprises; and selecting the two-step slice-based RACH procedure type based at least in part on the receive power level failing to satisfy the threshold receive power level.

Aspect 4: The method of any of aspects 2 through 3, further comprising: determining that the RACH procedure was unsuccessful after a threshold number of attempts, the threshold number of attempts based at least in part on the trigger; and performing a fallback RACH procedure using a four-step RACH procedure type of the set of RACH procedure types based at least in part on the unsuccessful RACH procedure.

Aspect 5: The method of any of aspects 1 through 4, further comprising: determining that the set of RACH procedure types comprises a four-step contention free RACH procedure type, a four-step slice-based RACH procedure type, and a four-step common RACH procedure type, wherein selecting the RACH procedure type comprises; and selecting the four-step contention free RACH procedure type for the RACH procedure based at least in part on a receive power level of a synchronization signal satisfying a threshold receive power level and the network slice.

Aspect 6: The method of aspect 5, further comprising: determining that the receive power level of the synchronization signal fails to satisfy the threshold receive power level, wherein selecting the RACH procedure type comprises; and selecting the four-step slice-based RACH procedure type based at least in part on the receive power level failing to satisfy the threshold receive power level.

Aspect 7: The method of any of aspects 1 through 6, further comprising: determining that the set of RACH procedure types comprises a two-step slice-based RACH procedure type and a four-step common RACH procedure type, wherein selecting the RACH procedure type comprises; and selecting the two-step slice-based RACH procedure type for the RACH procedure based at least in part on the network slice.

Aspect 8: The method of aspect 7, further comprising: determining that the RACH procedure was unsuccessful after a threshold number of attempts, the threshold number of attempts based at least in part on the trigger;

and performing a fallback RACH procedure using the four-step common RACH procedure type based at least in part on the unsuccessful RACH procedure.

Aspect 9: The method of any of aspects 1 through 8, further comprising: determining that the set of RACH procedure types comprises a two-step slice-based RACH procedure type, a four-step slice-based RACH procedure type, and a four-step common RACH procedure type, wherein selecting the RACH procedure type comprises; and selecting the two-step slice-based RACH procedure type for the RACH procedure based at least in part on a receive power level of a synchronization signal satisfying a threshold receive power level and the network slice.

Aspect 10: The method of aspect 9, further comprising: determining that the receive power level of the synchronization signal fails to satisfy the threshold receive power level, wherein selecting the RACH procedure type comprises; and selecting the four-step slice-based RACH procedure type for the RACH procedure based at least in part on the receive power level failing to satisfy the threshold receive power level.

Aspect 11: The method of any of aspects 9 through 10, further comprising: determining that the RACH procedure was unsuccessful after a threshold number of attempts, the threshold number of attempts based at least in part on the trigger; and performing a fallback RACH procedure using the four-step slice-based RACH procedure type based at least in part on the unsuccessful RACH procedure.

Aspect 12: The method of any of aspects 1 through 11, further comprising: determining that the set of RACH procedure types comprises a four-step slice-based RACH procedure type and a two-step or four-step common RACH procedure type, wherein selecting the RACH procedure type comprises; selecting the four-step slice-based RACH procedure type for the RACH procedure based at least in part on the network slice; and refraining from performing a fallback RACH procedure using the two-step or four-step common RACH procedure type.

Aspect 13: The method of any of aspects 1 through 12, further comprising: determining that the set of RACH procedure types comprises a two-step slice-based RACH procedure type, a two-step common RACH procedure type, a four-step slice-based RACH procedure type, and a four-step common RACH procedure type, wherein selecting the RACH procedure type comprises; and selecting the two-step slice-based RACH procedure type for the RACH procedure based at least in part on a receive power level of a synchronization signal satisfying a threshold receive power level and the network slice.

Aspect 14: The method of aspect 13, further comprising: determining that the receive power level of the synchronization signal fails to satisfy the threshold receive power level, wherein selecting the RACH procedure type comprises; and selecting the four-step slice-based RACH procedure type for the RACH procedure based at least in part on the receive power level failing to satisfy the threshold receive power level.

Aspect 15: The method of any of aspects 13 through 14, further comprising: determining that the RACH procedure was unsuccessful after a threshold number of attempts, the threshold number of attempts based at least in part on the trigger; and performing a fallback RACH procedure using the four-step slice-based RACH procedure type based at least in part on the unsuccessful RACH procedure.

Aspect 16: The method of any of aspects 1 through 15, further comprising: determining that a second RACH procedure is being performed separate from the RACH procedure to be performed for the network slice, the second RACH procedure associated with a priority level; and canceling the second RACH procedure to perform the RACH procedure type for the network slice based at least in part on the network slice being associated with a higher priority level than the priority level of the second RACH procedure.

Aspect 17: The method of any of aspects 1 through 16, wherein a resource of each RACH procedure type is non-overlapping with resources of other RACH procedure types in the set of RACH procedure types.

Aspect 18: The method of any of aspects 1 through 17, wherein the network slice comprises a network slice assistance information, a single network slice selection assistance information, a slice type, a service type, a set of single network slice selection assistance information, or any combination thereof.

Aspect 19: The method of any of aspects 1 through 18, wherein an uplink data associated with the network slice is identified by the UE while the UE is operating in a RRC idle state or an RRC inactive state.

Aspect 20: The method of any of aspects 1 through 19, wherein an uplink data associated with the network slice is identified by the UE while the UE is operating in a RRC connected state and the UE is not configured with a PUCCH to transmit a scheduling request.

Aspect 21: The method of any of aspects 1 through 20, wherein an uplink data associated with the network slice is identified by the UE while the UE is operating in a RRC connected state and the UE is not uplink synchronized.

Aspect 22: A method for wireless communication at a base station, comprising: transmitting, to a UE, an indication of a configuration for a set of RACH procedure types for a BWP of the UE, each RACH procedure type in the set of RACH procedure types being different from other RACH procedure types in the set of RACH procedure types; transmitting, to the UE, a trigger to perform a RACH procedure type for a network slice; and performing the RACH procedure for the network slice according to a RACH procedure type selected by the UE from the set of RACH procedure types based at least in part on the indication of the configuration for the set of RACH procedure types and on the trigger.

Aspect 23: The method of aspect 22, wherein the set of RACH procedure types comprises a two-step contention free RACH procedure type, a two-step slice-based RACH procedure type, and a two-step common RACH procedure type, and wherein performing the RACH procedure comprises: performing the RACH procedure using the two-step contention free RACH procedure type based at least in part on the UE determining that a receive power level of a synchronization signal satisfies a threshold receive power level and the network slice.

Aspect 24: The method of aspect 23, wherein performing the RACH procedure comprises: performing the RACH procedure using the two-step slice-based RACH procedure type based at least in part on the UE determining that the receive power level fails to satisfy the threshold receive power level.

Aspect 25: The method of any of aspects 23 through 24, further comprising: performing a fallback RACH procedure using a four-step RACH procedure type of the set of RACH procedure types based at least in part on the UE determining that the RACH procedure was unsuccessful after a threshold number of attempts.

Aspect 26: The method of any of aspects 22 through 25, wherein that the set of RACH procedure types comprises a four-step contention free RACH procedure type, a four-step slice-based RACH procedure type, and a four-step common RACH procedure type, and wherein performing the RACH procedure comprises: performing the RACH procedure using the four-step contention free RACH procedure type based at least in part on the UE determining that a receive power level of a synchronization signal satisfies a threshold receive power level and the network slice.

Aspect 27: The method of aspect 26, wherein performing the RACH procedure comprises: performing the RACH procedure using the four-step slice-based RACH procedure type based at least in part on the UE determining that the receive power level fails to satisfy the threshold receive power level.

Aspect 28: The method of any of aspects 22 through 27, wherein the set of RACH procedure types comprises a two-step slice-based RACH procedure type and a four-step common RACH procedure type, and wherein performing the RACH procedure comprises: performing the RACH procedure using the two-step slice-based RACH procedure type based at least in part on the network slice.

Aspect 29: The method of aspect 28, further comprising: performing a fallback RACH procedure using the four-step common RACH procedure type based at least in part on the UE determining that the RACH procedure was unsuccessful after a threshold number of attempts.

Aspect 30: The method of any of aspects 22 through 29, wherein the set of RACH procedure types comprises a two-step slice-based RACH procedure type, a four-step slice-based RACH procedure type, and a four-step common RACH procedure type, and wherein performing the RACH procedure comprises: performing the RACH procedure using the two-step slice-based RACH procedure type based at least in part on the UE determining that a receive power level of a synchronization signal satisfies a threshold receive power level and the network slice.

Aspect 31: The method of aspect 30, wherein performing the RACH procedure comprises: performing the RACH procedure using the four-step slice-based RACH procedure type based at least in part on the UE determining that the receive power level fails to satisfy the threshold receive power level.

Aspect 32: The method of any of aspects 30 through 31, further comprising: performing a fallback RACH procedure using the four-step slice-based RACH procedure type based at least in part on the UE determining that the RACH procedure was unsuccessful after a threshold number of attempts.

Aspect 33: The method of any of aspects 22 through 32, wherein the set of RACH procedure types comprises a four-step slice-based RACH procedure type, and a two-step or four-step common RACH procedure type, and wherein performing the RACH procedure comprises: performing the RACH procedure using the four-step slice-based RACH procedure type based at least in part on the network slice; and refraining from performing a fallback RACH procedure using the two-step or four-step common RACH procedure type.

Aspect 34: The method of any of aspects 22 through 33, wherein the set of RACH procedure types comprises a two-step slice-based RACH procedure type, a two-step common RACH procedure type, a four-step slice-based RACH procedure type, and a four-step common RACH procedure type, and wherein performing the RACH procedure comprises: performing the RACH procedure using the two-step slice-based RACH procedure type based at least in part on the UE determining that a receive power level of a synchronization signal satisfies a threshold receive power level and the network slice.

Aspect 35: The method of aspect 34, wherein determining that the receive power level of the synchronization signal fails to satisfy the threshold receive power level, wherein performing the RACH procedure comprises; and performing the RACH procedure using the four-step slice-based RACH procedure type based at least in part on the UE determining that the receive power level fails to satisfy the threshold receive power level.

Aspect 36: The method of any of aspects 34 through 35, further comprising: performing a fallback RACH procedure using the four-step slice-based RACH procedure type based at least in part on the UE determining that the RACH procedure was unsuccessful after a threshold number of attempts.

Aspect 37: The method of any of aspects 22 through 36, further comprising: determining that a second RACH procedure is being performed with the UE separate from the RACH procedure to be performed for the network slice, the second RACH procedure associated with a priority level; and canceling the second RACH procedure to perform the RACH procedure for the network slice based at least in part on the network slice being associated with a higher priority level than the priority level of the second RACH procedure.

Aspect 38: The method of any of aspects 22 through 37, wherein a resource of each RACH procedure type is non-overlapping with resources of other RACH procedure types in the set of RACH procedure types.

Aspect 39: The method of any of aspects 22 through 38, wherein the network slice comprises a network slice assistance information, a single network slice selection assistance information, a slice type, a service type, a set of single network slice selection assistance information, or any combination thereof.

Aspect 40: An apparatus for wireless communication at a UE, comprising a processor; memory coupled with the processor; and instructions stored in the memory and executable by the processor to cause the apparatus to perform a method of any of aspects 1 through 21.

Aspect 41: An apparatus for wireless communication at a UE, comprising at least one means for performing a method of any of aspects 1 through 21.

Aspect 42: A non-transitory computer-readable medium storing code for wireless communication at a UE, the code comprising instructions executable by a processor to perform a method of any of aspects 1 through 21.

Aspect 43: An apparatus for wireless communication at a base station, comprising a processor; memory coupled with the processor; and instructions stored in the memory and executable by the processor to cause the apparatus to perform a method of any of aspects 22 through 39.

Aspect 44: An apparatus for wireless communication at a base station, comprising at least one means for performing a method of any of aspects 22 through 39.

Aspect 45: A non-transitory computer-readable medium storing code for wireless communication at a base station, the code comprising instructions executable by a processor to perform a method of any of aspects 22 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving an indication of a configuration for a set of random access channel procedure types for a bandwidth part of the UE, each random access channel procedure type in the set of random access channel procedure types being different from other random access channel procedure types in the set of random access channel procedure types, wherein the set of random access channel procedure types comprises a common random access channel procedure type and at least one slice-based random access channel procedure type;

receiving a trigger to perform a random access channel procedure for a network slice, the trigger comprising an indication of an identity of the network slice;

selecting a random access channel procedure type from the set of random access channel procedure types for a random access channel procedure based at least in part on the indication of the configuration for the set of random access channel procedure types and on the identity of the network slice;

performing the random access channel procedure for the network slice according to the random access channel procedure type;

determining that a second random access channel procedure is being performed separate from the random access channel procedure for the network slice, the second random access channel procedure associated with a priority level and corresponding to common random access channel procedure type; and canceling the second random access channel procedure to perform the random access channel procedure for the network slice based at least in part on the network slice being associated with a higher priority level than the priority level of the second random access channel procedure.

2. The method of claim 1, further comprising:

determining that the set of random access channel procedure types comprises a two-step contention free random access channel procedure type, a two-step slice-based random access channel procedure type, and a two-step common random access channel procedure type, wherein selecting the random access channel procedure type comprises; and selecting the two-step contention free random access channel procedure type for the random access channel procedure based at least in part on a receive power level of a synchronization signal satisfying a threshold receive power level and the network slice.

3. The method of claim 2, further comprising:

determining that the receive power level of the synchronization signal fails to satisfy the threshold receive power level, wherein selecting the random access channel procedure type comprises; and selecting the two-step slice-based random access channel procedure type based at least in part on the receive power level failing to satisfy the threshold receive power level.

4. The method of claim 2, further comprising:

determining that the random access channel procedure was unsuccessful after a threshold number of attempts, the threshold number of attempts based at least in part on the trigger; and performing a fallback random access channel procedure using a four-step random access channel procedure type of the set of random access channel procedure types based at least in part on the unsuccessful random access channel procedure.

5. The method of claim 1, further comprising:

determining that the set of random access channel procedure types comprises a four-step contention free random access channel procedure type, a four-step slice-based random access channel procedure type, and a four-step common random access channel procedure type, wherein selecting the random access channel procedure type comprises; and selecting the four-step contention free random access channel procedure type for the random access channel procedure based at least in part on a receive power level of a synchronization signal satisfying a threshold receive power level and the network slice.

6. The method of claim 5, further comprising:

determining that the receive power level of the synchronization signal fails to satisfy the threshold receive power level, wherein selecting the random access channel procedure type comprises; and selecting the four-step slice-based random access channel procedure type based at least in part on the receive power level failing to satisfy the threshold receive power level.

7. The method of claim 1, further comprising:

determining that the set of random access channel procedure types comprises a two-step slice-based random access channel procedure type and a four-step common random access channel procedure type, wherein selecting the random access channel procedure type comprises; and selecting the two-step slice-based random access channel procedure type for the random access channel procedure based at least in part on the network slice.

8. The method of claim 7, further comprising:

determining that the random access channel procedure was unsuccessful after a threshold number of attempts, the threshold number of attempts based at least in part on the trigger; and performing a fallback random access channel procedure using the four-step common random access channel procedure type based at least in part on the unsuccessful random access channel procedure.

9. The method of claim 1, further comprising:

determining that the set of random access channel procedure types comprises a two-step slice-based random access channel procedure type, a four-step slice-based random access channel procedure type, and a four-step common random access channel procedure type, wherein selecting the random access channel procedure type comprises; and selecting the two-step slice-based random access channel procedure type for the random access channel procedure based at least in part on a receive power level of a synchronization signal satisfying a threshold receive power level and the network slice.

10. The method of claim 9, further comprising:

determining that the receive power level of the synchronization signal fails to satisfy the threshold receive power level, wherein selecting the random access channel procedure type comprises; and selecting the four-step slice-based random access channel procedure type for the random access channel procedure based at least in part on the receive power level failing to satisfy the threshold receive power level.

11. The method of claim 9, further comprising:

determining that the random access channel procedure was unsuccessful after a threshold number of attempts, the threshold number of attempts based at least in part on the trigger; and performing a fallback random access channel procedure using the four-step slice-based random access channel procedure type based at least in part on the unsuccessful random access channel procedure.

12. The method of claim 1, further comprising:

determining that the set of random access channel procedure types comprises a four-step slice-based random access channel procedure type and a two-step or four-step common random access channel procedure type, wherein selecting the random access channel procedure type comprises;

selecting the four-step slice-based random access channel procedure type for the random access channel procedure based at least in part on the network slice; and refraining from performing a fallback random access channel procedure using the two-step or the four-step common random access channel procedure type.

13. The method of claim 1, further comprising:

determining that the set of random access channel procedure types comprises a two-step slice-based random access channel procedure type, a two-step common random access channel procedure type, a four-step slice-based random access channel procedure type, and a four-step common random access channel procedure type, wherein selecting the random access channel procedure type comprises; and selecting the two-step slice-based random access channel procedure type for the random access channel procedure based at least in part on a receive power level of a synchronization signal satisfying a threshold receive power level and the network slice.

14. The method of claim 13, further comprising:

determining that the receive power level of the synchronization signal fails to satisfy the threshold receive power level, wherein selecting the random access channel procedure type comprises; and selecting the four-step slice-based random access channel procedure type for the random access channel procedure based at least in part on the receive power level failing to satisfy the threshold receive power level.

15. The method of claim 13, further comprising:

determining that the random access channel procedure was unsuccessful after a threshold number of attempts, the threshold number of attempts based at least in part on the trigger; and performing a fallback random access channel procedure using the four-step slice-based random access channel procedure type based at least in part on the unsuccessful random access channel procedure.

16. The method of claim 1, wherein a resource of each random access channel procedure type is non-overlapping with resources of other random access channel procedure types in the set of random access channel procedure types.

17. The method of claim 1, wherein the network slice comprises a network slice assistance information, a single network slice selection assistance information, a slice type, a service type, a set of single network slice selection assistance information, or any combination thereof.

18. The method of claim 1, wherein an uplink data associated with the network slice is identified by the UE while the UE is operating in a radio resource control (RRC) idle state or an RRC inactive state.

19. The method of claim 1, wherein an uplink data associated with the network slice is identified by the UE while the UE is operating in a radio resource control connected state and the UE is not configured with a physical uplink control channel resource to transmit a scheduling request.

20. The method of claim 1, wherein an uplink data associated with the network slice is identified by the UE while the UE is operating in a radio resource control connected state and the UE is not uplink synchronized.

21. A method for wireless communication at a base station, comprising:

transmitting, to a user equipment (UE), an indication of a configuration for a set of random access channel procedure types for a bandwidth part of the UE, each random access channel procedure type in the set of random access channel procedure types being different from other random access channel procedure types in the set of random access channel procedure types, wherein the set of random access channel procedure types comprises a common random access channel procedure type and at least one slice-based random access channel procedure type;

transmitting, to the UE, a trigger to perform a random access channel procedure for a network slice, the trigger comprising an indication of an identity of the network slice; and performing the random access channel procedure for the network slice according to a random access channel procedure type selected by the UE from the set of random access channel procedure types based at least in part on the indication of the configuration for the set of random access channel procedure types and on the identity of the network slice, wherein a second random access channel procedure is canceled to perform the random access channel procedure for the network slice based at least in part on the network slice being associated with a higher priority level than the priority level of the second random access channel procedure.

22. The method of claim 21, wherein the set of random access channel procedure types comprises a two-step contention free random access channel procedure type, a two-step slice-based random access channel procedure type, and a two-step common random access channel procedure type, and wherein performing the random access channel procedure comprises:

performing the random access channel procedure using the two-step contention free random access channel procedure type based at least in part on the UE determining that a receive power level of a synchronization signal satisfies a threshold receive power level and the network slice.

23. The method of claim 22, wherein performing the random access channel procedure comprises:

performing the random access channel procedure using the two-step slice-based random access channel procedure type based at least in part on the UE determining that the receive power level fails to satisfy the threshold receive power level.

24. The method of claim 22, further comprising:

performing a fallback random access channel procedure using a four-step random access channel procedure type of the set of random access channel procedure types based at least in part on the UE determining that the random access channel procedure was unsuccessful after a threshold number of attempts.

25. The method of claim 21, wherein the set of random access channel procedure types comprises a four-step contention free random access channel procedure type, a four-step slice-based random access channel procedure type, and a four-step common random access channel procedure type, and wherein performing the random access channel procedure comprises:

performing the random access channel procedure using the four-step contention free random access channel procedure type based at least in part on the UE determining that a receive power level of a synchronization signal satisfies a threshold receive power level and the network slice.

26. The method of claim 25, wherein performing the random access channel procedure comprises:

performing the random access channel procedure using the four-step slice-based random access channel procedure type based at least in part on the UE determining that the receive power level fails to satisfy the threshold receive power level.

27. The method of claim 21, wherein the set of random access channel procedure types comprises a two-step slice-based random access channel procedure type and a four-step common random access channel procedure type, and wherein performing the random access channel procedure comprises:

performing the random access channel procedure using the two-step slice-based random access channel procedure type based at least in part on the network slice.

28. An apparatus for wireless communication at a user equipment (UE), comprising:

a processor;

memory coupled with the processor; and instructions stored in the memory and executable by the processor to cause the apparatus to:

receive an indication of a configuration for a set of random access channel procedure types for a bandwidth part of the UE, each random access channel procedure type in the set of random access channel procedure types being different from other random access channel procedure types in the set of random access channel procedure types, wherein the set of random access channel procedure types comprises a common random access channel procedure type and at least one slice-based random access channel procedure type;

receive a trigger to perform a random access channel procedure for a network slice, the trigger comprising an indication of an identity of the network slice;

select a random access channel procedure type from the set of random access channel procedure types for a random access channel procedure based at least in part on the indication of the configuration for the set of random access channel procedure types and on the identity of the network slice;

perform the random access channel procedure for the network slice according to the random access channel procedure type;

determine that a second random access channel procedure is being performed separate from the random access channel procedure for the network slice, the second random access channel procedure associated with a priority level and corresponding to common random access channel procedure type; and cancel the second random access channel procedure to perform the random access channel procedure for the network slice based at least in part on the network slice being associated with a higher priority level than the priority level of the second random access channel procedure.

29. An apparatus for wireless communication at a base station, comprising:

a processor;

memory coupled with the processor; and instructions stored in the memory and executable by the processor to cause the apparatus to:

transmit, to a user equipment (UE), an indication of a configuration for a set of random access channel procedure types for a bandwidth part of the UE, each random access channel procedure type in the set of random access channel procedure types being different from other random access channel procedure types in the set of random access channel procedure types, wherein the set of random access channel procedure types comprises a common random access channel procedure type and at least one slice-based random access channel procedure type;

transmit, to the UE, a trigger to perform a random access channel procedure type for a network slice, the trigger comprising an indication of an identity of the network slice; and perform the random access channel procedure for the network slice according to a random access channel procedure type selected by the UE from the set of random access channel procedure types based at least in part on the indication of the configuration for the set of random access channel procedure types and on the identity of the network slice, wherein a second random access channel procedure is canceled to perform the random access channel procedure for the network slice based at least in part on the network slice being associated with a higher priority level than a priority level of the second random access channel procedure.

* * * * *